(12) United States Patent
Liu

(10) Patent No.: US 12,500,845 B2
(45) Date of Patent: Dec. 16, 2025

(54) SERVICE PROCESSING METHOD AND SERVICE PROCESSING DEVICE

(71) Applicant: ZTE Corporation, Shenzhen (CN)

(72) Inventor: Feng Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 132 days.

(21) Appl. No.: 18/572,739

(22) PCT Filed: Jun. 7, 2022

(86) PCT No.: PCT/CN2022/097416
§ 371 (c)(1),
(2) Date: Dec. 20, 2023

(87) PCT Pub. No.: WO2022/267882
PCT Pub. Date: Dec. 29, 2022

(65) Prior Publication Data
US 2024/0297849 A1  Sep. 5, 2024

(30) Foreign Application Priority Data

Jun. 21, 2021 (CN) .......................... 202110687990.0

(51) Int. Cl.
*H04L 47/25* (2022.01)
(52) U.S. Cl.
CPC ................................... *H04L 47/25* (2013.01)
(58) Field of Classification Search
CPC ....................................................... H04L 47/25
USPC ....................................................... 709/238
See application file for complete search history.

(56) References Cited

U.S. PATENT DOCUMENTS

| 7,944,941 | B1 | 5/2011 | Bottorff et al. | |
| 2020/0244383 | A1* | 7/2020 | He | H04W 56/00 |
| 2020/0328767 | A1* | 10/2020 | Zhong | H04B 1/04 |
| 2021/0058156 | A1* | 2/2021 | Su | H04L 47/829 |
| 2021/0084383 | A1 | 3/2021 | Xiang | |
| 2021/0218631 | A1* | 7/2021 | Bugenhagen | H04L 12/2854 |
| 2022/0416895 | A1 | 12/2022 | Liu | |

FOREIGN PATENT DOCUMENTS

| CN | 110557217 A | 12/2019 |
| CN | 111917506 A | 11/2020 |
| CN | 112865910 A | 5/2021 |
| EP | 3588837 B1 | 4/2021 |
| WO | WO 2021/103928 A1 | 6/2021 |

OTHER PUBLICATIONS

International Search Report and Written Opinion for International Application No. PCT/CN2022/097416, mailed Aug. 18, 2022.
Extended European Search Report for European Application No. 22827378.5, dated May 23, 2025.

* cited by examiner

*Primary Examiner* — Wing F Chan
*Assistant Examiner* — Leon Y Tseng
(74) *Attorney, Agent, or Firm* — Wolf, Greenfield & Sacks, P.C.

(57) ABSTRACT

A service processing method and a service processing device are disclosed. The service processing method may include: determining overhead information and determining a payload area for carrying the overhead information and service data in a bearer frame when a low-rate client service is borne in a communication network; and mapping the overhead information and the service data to the payload area.

20 Claims, 12 Drawing Sheets

| Member identifier | Multiframe identifier | Timestamp value information | Adjustment indication information | Check information |
|---|---|---|---|---|

| S block | D block | D block | D block | D block | D block | D block | T block |
|---|---|---|---|---|---|---|---|
| S | O | 8Byte | 8Byte | 8Byte | 8Byte | 8Byte | 6Byte |
|  | n*Byte |  |  |  |  |  | 1Byte |
|  |  |  |  |  |  |  | T |

| S block | D block | D block | D block | D block | D block | D block | T block |
|---|---|---|---|---|---|---|---|
| S | O | 8Byte | 8Byte | 8Byte | 8Byte | 8Byte | 7Byte |
|  | 1Byte |  |  |  |  |  | T |
|  | m*Byte |  |  |  |  |  |  |

| | 2bit | 8bit | 8bit | 8bit | 8bit | 8bit | 8bit | 8bit | 8bit |
|---|---|---|---|---|---|---|---|---|---|
| Structure of S block | 10 | 0x78 | 0x55 | 0x55 | 0x55 | 0x55 | Overhead | Overhead | 0xD5 |

Fig. 19

| S block | D block | D block | D block | D block | T block |
|---|---|---|---|---|---|
| S | 8Byte | 8Byte | 8Byte | 8Byte | 7Byte |
| O | | | | | T |

Fig. 20

| S block | D block | D block | D block | D block | T block |
|---|---|---|---|---|---|
| S | 8Byte | 8Byte | 8Byte | 8Byte | 7Byte |
| O | | | | | |
| n*Byte | | | | | T |

Fig. 21

| | 2bit | 8bit | 8bit | 8bit | 8bit | 8bit | 8bit | 8bit | 8bit |
|---|---|---|---|---|---|---|---|---|---|
| Structure of S block | 10 | 0x78 | Overhead | Overhead | 1*Byte | 1*Byte | 1*Byte | 1*Byte | 0xD5 |

Fig. 22

SERVICE PROCESSING METHOD AND SERVICE PROCESSING DEVICE

CROSS-REFERENCE TO RELATED APPLICATION

This application is a national stage filing under 35 U.S.C. § 371 of International Patent Application Serial No. PCT/CN2022/097416, filed Jun. 7, 2022, which claims priority to Chinese patent application No. 202110687990.0 filed Jun. 21, 2021 The contents of these applications are incorporated herein by reference in their entirety.

TECHNICAL FIELD

The present disclosure relates to the field of data processing technologies, and in particular to, a service processing method and a service processing device.

BACKGROUND

The Flexible Ethernet (FlexE) protocol defines the bandwidth of each slot is 5 Gbit/s, but the granularity of a single slot is too large and not suitable for services with low transmission rate. For application scenarios with low transmission rate and a large number of client services, a FlexE slot with a rate of 5 Gbit/s is divided into 480 sub-slots, with the bandwidth of each sub-slot being 10.1 Mbit/s, so as to carry fine-grained client services with a rate of 10 Mbit/s or above.

However, no approach has been proposed for services with a granularity of less than 10 Mbit/s, such as E1 (with a rate of 2.048 Mbit/s) and T1 (with a rate of 1.544 Mbit/s) services in Synchronous Digital Hierarchy (SDH) standards. When such services are carried using the 10 Mbit/s sub-slots, the bandwidth is seriously wasted.

SUMMARY

The following is a summary of the subject matter set forth in the description. This summary is not intended to limit the scope of protection of the claims.

Embodiments of the present disclosure provide a service processing method and a service processing device.

In accordance with a first aspect of the present disclosure, an embodiment provides a service processing method, including: determining overhead information and determining a payload area for carrying the overhead information and service data in a bearer frame, in response to a low-rate client service being borne in a communication network, where the bearer frame is a specific code block stream including an S block, a D block and a T block, or a standard Ethernet frame as defined in an Ethernet protocol; and mapping the overhead information and the service data to the payload area.

In accordance with a second aspect of the present disclosure, an embodiment provides a service processing device, including at least one processor and a memory communicatively connected to the at least one processor, where the memory stores an instruction executable by the at least one processor which, when executed by the at least one processor, causes the at least one processor to implement the service processing method of the first aspect.

In accordance with a third aspect of the present disclosure, an embodiment provides a computer-readable storage medium, storing a computer-executable instruction which, when executed by a computer, causes the computer to implement the service processing method of the first aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and do not constitute a limitation to the technical schemes of the present disclosure.

FIG. 19 is a diagram showing an arrangement of bits when overhead information is configured in an S block according to Example One of the present disclosure;

FIG. 20 is a structural diagram of a frame structure where overhead information is configured in an S block according to Example One of the present disclosure;

FIG. 21 is a structural diagram of a frame structure where overhead information and service data are configured in an S block according to Example One of the present disclosure;

FIG. 22 is a diagram showing an arrangement of bits when overhead information and service data are configured in an S block according to Example One of the present disclosure;

DETAILED DESCRIPTION

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

Figure 1:
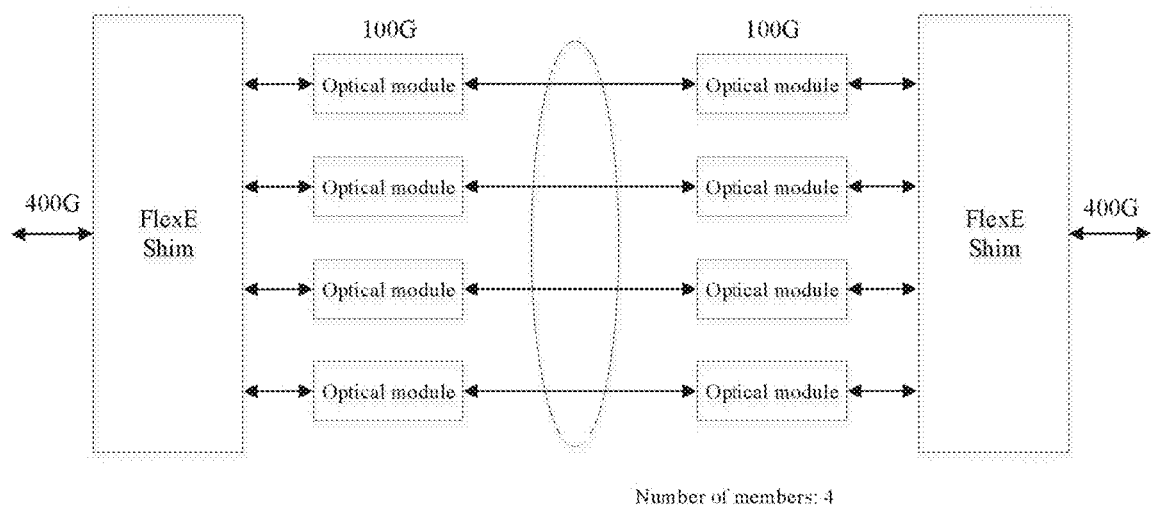
FIG. 1 is a diagram showing a general architecture in the FlexE protocol.

The FlexE protocol defines a method for transmitting a client service with a rate of n*5 Gbit/s (where n is a positive integer), and a client service with a rate of 5 Gbit/s or above can be efficiently carried through a FlexE physical interface. FIG. 1 shows a general structure of the FlexE protocol. For example, to support a 400G service transmission bandwidth, four 100G optical modules are combined into a 400G transmission channel based on the FlexE protocol, to solve a transmission requirement of a 400G service without increasing the costs. For 100G physical layers, Ethernet protocol defines that before a 100G data packet is sent, the data packet is 64B/66B encoded to extend a 64-bit data block to a 66-bit information block, two additional bits are located in the front of the 66-bit block as a flag indicating the start of the 66-bit block, and then the 66-bit block is sent out through an optical transmission port. During receiving, an optical transmission port of a receive-end device identifies a 66-bit block from a received data stream, then recovers original 64-bit data from the 66-bit block, and reassembles a data packet from the 64-bit data.

Figure 2:
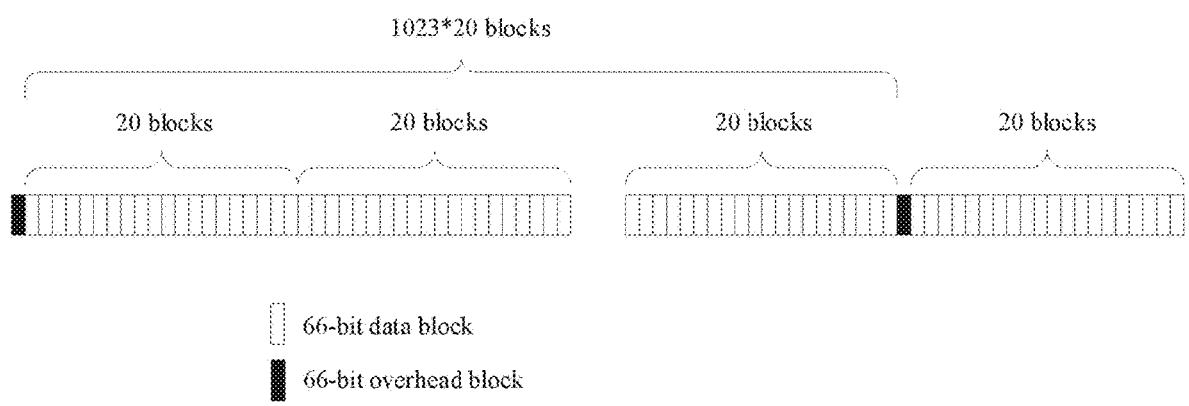
FIG. 2 shows an arrangement of bit blocks in a 64B/66B encoding technology.

The FlexE protocol is deployed under the conversion layer responsible for 64B/66B encoding, to perform sorting and planning for a 66-bit data block to be sent. The FlexE protocol provides a specific arrangement of bit blocks. As shown in FIG. 2, for a 100G service, every twenty 66-bit data blocks are grouped into one data block group, each group has 20 data blocks representing 20 slots, and each slot represents a service rate of 5 Gbit/s bandwidth. During sending of 66-bit data blocks, one FlexE overhead block is inserted for every 1023 data block groups (1023*20 data blocks). After the insertion of the overhead block, the sending of data blocks continues. After second 1023*20 data blocks are sent, one overhead block is inserted, and so on. The overhead blocks are denoted by black blocks in FIG. 2. In this way, overhead blocks are inserted periodically in the process of sending data blocks, and every two adjacent overhead blocks are spaced apart by 1023*20 data blocks. For a physical line rate of 100 Gbit/s, it is equivalent to the FlexE protocol dividing a physical port into 20 slots, with each slot providing a bandwidth of 5 Gbit/s. The slot number and slot bandwidth defined by the FlexE protocol can meet transmission requirements of routers, Optical Transport Networks (OTNs), and other client services. However, when the FlexE protocol is applied to low-rate services, some difficulties are encountered as follows.

1. Each 100G physical channel has only 20 slots in total, and the total number of slots is too small.
2. The bandwidth of each slot is 5 Gbit/s, and the granularity of a single slot is too large. Using such slots to carry low-rate services leads to a serious bandwidth waste.

Figure 3:
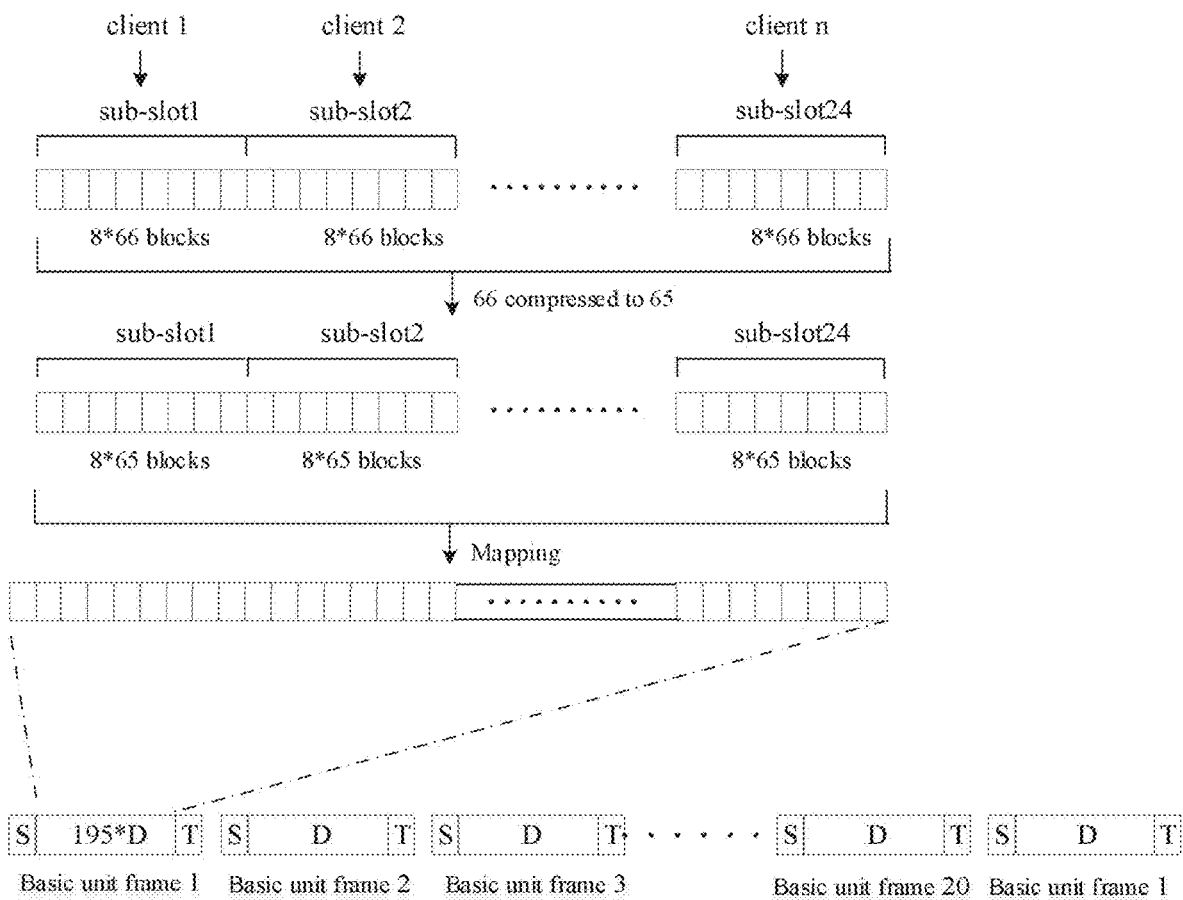
FIG. 3 shows a frame structure of a basic unit frame.

To meet transmission requirements of low-rate services, it is necessary to further refine the slot pipeline. In some cases, it is mentioned to carry and transmit fine-grained basic unit sequences in 5G slots. As shown in FIG. 3, by defining the basic unit frame structure, 24 sub-slots are divided and 20 basic unit frame structures form one multiframe, so there are a total of 480 sub-slots in one multiframe. Considering the bearer utilization rate, the bandwidth of each sub-slot is about 10.1 Mbit/s, so the basic unit frame structure can carry a 10M service. First, 64/66 encoding is performed for a 10M client service. Every eight 66-bit code blocks are grouped into one group and carried on one sub-slot after the encoding. Before carrying, eight 66-bit code blocks are respectively compressed into eight 65-bit code blocks (by compressing a 2-bit synchronization header into 1 bit). The 24 groups each including eight 65-bit code blocks are mapped to a basic unit frame structure as a whole. Then, the basic unit frame structure is mapped to a 5G slot of the FlexE protocol and sent out. In this way, the basic unit frame structure is transmitted to a remote destination device on a 5G slot of the FlexE protocol.

The above carrying mode can carry services at a rate of 10 Mbit/s. However, in application scenarios with finer service granularity (low-rate service), such as those where a 2.048 Mbit/s E1 service or a 1.544 Mbit/s T1 service needs to be carried, directly using the sub-slots of the above basic unit frame structure also leads to a serious bandwidth waste.

In view of the above, the embodiments of the present disclosure provide a service processing method and a service processing device. For a service scenario with finer granularity (low-rate service), in order to improve the bearer efficiency using existing 10 Mbit/s slots, the embodiments of the present disclosure provide a corresponding frame format and a service processing method using the frame format, to ensure the transmission efficiency of low-rate services.

Figure 4:
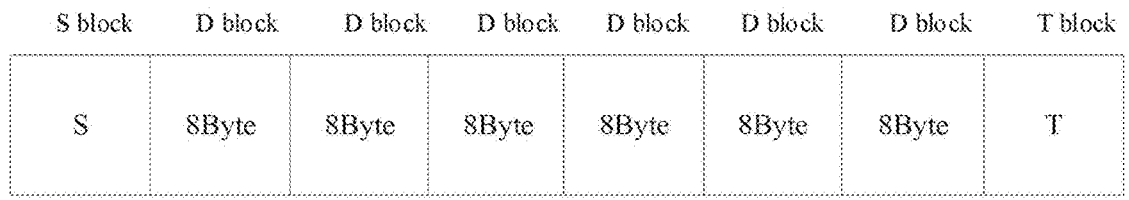
FIG. 4 is a structural diagram of a frame structure according to an embodiment of the present disclosure.

Referring to FIG. 4, an embodiment of the present disclosure provides a frame structure of a bearer frame, including a frame header flag block, a data block, and an end-of-frame flag block.

The frame header flag block includes a frame header code block and a first data area.

The data block is configured between the frame header flag block and the end-of-frame flag block.

The end-of-frame flag block includes a second data area and an end code block.

An area formed by the first data area, the data block, and the second data area is configured for carrying overhead information and service data. An area for carrying service data is defined as a payload area. The size of the payload area is determined according to a bearer efficiency threshold. The bearer efficiency threshold is determined according to a service rate of a service to be carried and a slot rate of a slot for sending the service.

Typically, the service rate of the service is less than the slot rate of the slot, such that a plurality of services can be sent in one slot pipeline. For example, for a slot rate of 10.1 Mbit/s, the frame structure includes an S block, 195 D blocks, and a T block, where the S block represents a frame header flag block for carrying the frame header code block of the bearer frame, the D block represents a data block for carrying service data, and the T block represents an end-of-frame flag block for carrying an end code block of the bearer frame. If a 2.048 Mbit/s E1 service or a 1.544 Mbit/s T1 service is carried in this frame structure, the bearer efficiency is seriously low.

Therefore, the frame structure in the embodiments of the present disclosure considers a bearer efficiency threshold of a current slot pipeline, and the structure of the bearer frame is determined for the current slot pipeline according to the bearer efficiency threshold. First, it is defined that the frame structure of the bearer frame includes an S block, D blocks, and a T block. As shown in FIG. 4, the D blocks are located between the S block and the T block, to carry service data. In a 64B/66B encoding technology, each D block can carry 8 bytes of service data. The number of D blocks can be set according to actual requirements, to obtain different frame structures. The S block is divided into two parts, namely, a frame header code block and a first data area. The T block is divided into two parts, namely, a second data area and an end code block. Without considering occupation by overhead information, the first data area, a plurality of data blocks, and the second data area constitute a payload area for carrying service data. Considering the occupation by the overhead information, the part occupied by the overhead information is removed from an area formed by the first data area, the plurality of data blocks, and the second data area, to obtain the payload area.

Figure 5:
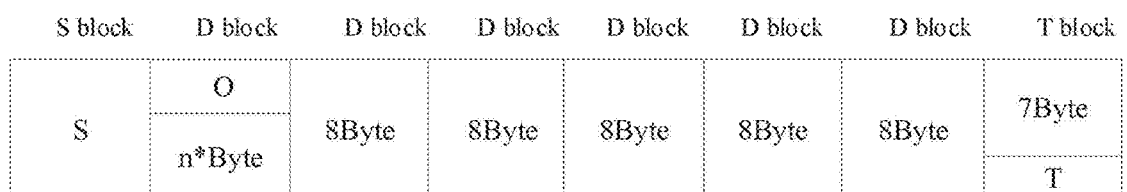
FIG. 5 is a structural diagram of a frame structure using a T7 block according to an embodiment of the present disclosure.

In the 64B/66B encoding technology, the S block, the D blocks, and the T block occupy 66 bits. It is defined that the S block includes a synchronization header of 2 bits and a frame header code block occupying at least one byte, with contents of the remaining seven bytes being fixed values, which can be replaced with overhead information or service data. Similarly, the T block includes a synchronization header of 2 bits and an end code block occupying at least one byte, and contents of the remaining seven bytes can be used for carrying service data. In Ethernet standards, there are eight types of T blocks: T0, T1, T2, T3, T4, T5, T6, and T7. T0 does not carry client information, T1 carries one byte of client information, T2 carries two bytes of client information, . . . , and T7 carries seven bytes of client information. To improve the bearer efficiency, the bearer frame for carrying a low-rate service in the embodiments of the present disclosure can use the T7 format as the T block, the specific frame structure of which is shown in FIG. 5, where seven bytes of service data are carried in T7. In addition to a synchronization header of 2 bits, the D block includes eight bytes for carrying actual data. For example, overhead information (denoted by 0 in the figure) and service data can both be carried in the D block. One D block carries eight bytes (64 bits) of data. If the overhead information occupies two bytes (16 bits), the remaining six bytes (48 bits) in the D block carry service data. If the overhead information occupies three bytes (24 bits), the remaining five bytes (40 bits) in the D block carry service data. If the overhead information occupies four bytes (32 bits), the remaining four bytes (32 bits) in the D block carry service data. In FIG. 5, n represents the number of bytes remaining in the current D block for carrying service data.

It can be understood that because the size of the first data area, the number of data blocks, and the size of the second data area can be determined according to an actual service rate and slot rate, more service data can be carried in a single bearer frame by setting the size of the payload area, thereby increasing the ratio between the payload area and the bearer frame to reach the bearer efficiency threshold. The influence of the bearer efficiency threshold on the size of the payload area will be described later in the embodiments of the service processing method, and the frame structure of the bearer frame is described first here.

Figures 6, 7, 8, 9:
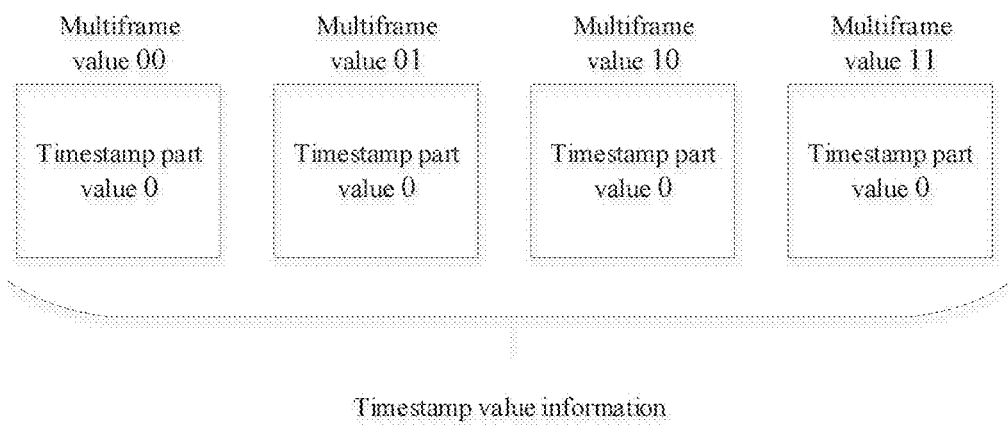
FIG. 6 is a structural diagram of overhead information according to an embodiment of the present disclosure.
FIG. 7 is a schematic diagram of transmitting a plurality of timestamp portion values in a multiframe according to an embodiment of the present disclosure.
FIG. 8 is a structural diagram of a frame structure where a last byte in the payload area is configured as an adjustment area according to an embodiment of the present disclosure.
FIG. 9 is a structural diagram of a frame structure where a first byte in the payload area is configured as an adjustment area according to an embodiment of the present disclosure.

The overhead information is used for representing characteristic information of the bearer frame, including but not limited to the following information: member identifier, multiframe identifier, timestamp value information, adjustment indication information, and check information. As shown in FIG. 6, the functions of the overhead information are as follows.

Member identifier: In the presence of multiple services, the member identifier is used for identifying each of the multiple services to distinguish the service members. For example, to carry E1/T1 services with a sub-slot bandwidth of 10.1 Mbit/s, four E1 services with a service rate of 2.048 Mbit/s (or six T1 services with a service rate of 1.544 Mbit/s) can be simultaneously transmitted. In practice, different identification contents such as sequence values can be used to represent different E1/T1 clients. For example, 00, 01, 10, and 11 can be used to represent four different E1 services, and 000, 001, 010, 011, 100, and 101 can be used to represent six different T1 services. Each E1/T1 service is represented by a different sequence value to carry a different client, and the contents of the sequence values represent different clients.

Multiframe identifier: The multiframe identifier is used for forming a multiframe using bearer frames of a plurality of E1/T1 services to transmit more overhead information. The value of the multiframe identifier is a serial number of the bearer frame of each E1/T1 service in the multiframe. For example, if bearer frames of four E1/T1 services form one multiframe, the serial numbers of the bearer frames of the services are: 00, 01, 10, and 11; if bearer frames of eight E1/T1 services form one multiframe, the serial numbers of the bearer frames of the services are: 000, 001, 010, 011, 100, 101, 110, and 111. The multiframe identifier can also be in other similar forms, which will not be enumerated herein.

Timestamp value information: When an E1/T1 service is transmitted on a network, both the content and clock information of a client service need to be transmitted to a destination device. The destination device recovers an original E1/T1 service clock according to the clock information of the client service, and further recovers the E1/T1 client service. When service data of the E1/T1 service is mapped to a bearer frame of the E1/T1 service, a time value at the time of mapping is recorded, which can be used as timestamp value information of the E1/T1 service. The timestamp value information includes many bits. Generally, the time value can be of up to 10 bytes (80 bits) according to international standards. If the timestamp value information is carried in a bearer frame of one E1/T1 service, a large portion of the bandwidth of this E1/T1 service is occupied. Therefore, a bearer frame of each E1/T1 service can be used to transmit only a part of the timestamp value information, and the transmission of all parts of the timestamp value information is completed in one multiframe period. That is, when a plurality of bearer frames form one multiframe, the timestamp value information is divided into a plurality of parts according to the number of bearer frames in the multiframe, and each part of the timestamp value information is recorded in the overhead information of a corresponding bearer frame in the multiframe. For example, as shown in FIG. 7, the timestamp value information is divided into four parts, namely, a timestamp part value 0, a timestamp part value 1, a timestamp part value 2, and a timestamp part value 3, which are transmitted in four bearer frames in one multiframe.

It can be understood that the timestamp value information can be an absolute time value of mapping of the E1/T1 service to the bearer frame, or a difference between a clock frequency of the E1/T1 service and a reference frequency at the time of mapping of the E1/T1 service. The reference frequency can be obtained from a system clock of a local sending device, a clock of a fine-grained basic unit, a clock of a FlexE slot, and the like. When the timestamp value information is the absolute time value, the destination device receives a series of E1/T1 service byte numbers and corresponding absolute time values. The destination device calculates a frequency value of the service according to a change in the E1/T1 service byte number and a change in the absolute time value, and generates and recovers an E1/T1 clock. When the timestamp value information is the difference between the clock frequency of the E1/T1 service and the reference frequency, the destination device recovers the original E1/T1 clock according to a local reference frequency of the destination device and the timestamp value information (representing the difference between the clock of the E1/T1 service and the reference clock).

Adjustment indication information: Because each E1/T1 service has a different rate (because the rate of an E1/T1 service is allowed to have a slight fluctuation near a standard rate in protocol standards, different E1/T1 services have different actual rates), and the rates of the E1/T1 services can be different from rates of bearer frames of the E1/T1 services, the adjustment indication information is needed for rate adaptation between the rates of the E1/T1 services and the rates of the bearer frames of the E1/T1 services.

An adjustment area for rate adaptation is provided in the payload area, and the adjustment indication information is recorded in the overhead information to indicate whether the adjustment area carries service data. For example, when the payload area in the bearer frame of the E1/T1 service carries service data, the service data of E1/T1 is usually carried in the entire payload area. When the function of the adjustment indication information is enabled, a part of the payload area is set as the adjustment area. As shown in FIG. 8, the last byte of payload area is set as the adjustment area. In practical applications, the first byte of the payload area can alternatively be set as the adjustment area, as shown in FIG. 9. The adjustment area may or may not carry service data of the E1/T1 service. When the adjustment area carries service data of the E1/T1 service, it means that the E1/T1 traffic volume carried by the bearer frame is increased, the rate of the bearer pipeline is increased, and an E1/T1 client service with a high rate can be carried. When the adjustment area does not carry service data of the E1/T1 service, it means that the E1/T1 traffic volume carried by the bearer frame is reduced, the rate of the bearer pipeline is reduced, and an E1/T1 client service with a low rate can be carried. Whether the adjustment area carries service data of the E1/T1 service can be determined by the content of the adjustment indication information. For example, when the content of the adjustment indication information is "1", it indicates that the adjustment area carries service data of the E1/T service; and when the content of the adjustment indication information is "0", it indicates that the adjustment area does not carry service data of the E1/T1 service. The content of the adjustment indication information can also be of more bits. For example, whether the adjustment area carries service data of the E1/T1 service is determined based on values of the majority of bits in the adjustment indication information, to avoid erroneous determinations caused by bit errors. For example, when the content of the adjustment indication information is "111" (or two of the three bits are "1", e.g., "110", "101", or "011"), it indicates that the adjustment area carries service data of the E1/T1 service; and when the content of the adjustment indication information is "000" (or two of the three bits are "0", e.g., "001", "010", or "100"), it indicates that the adjustment area does not carry service data of the E1/T1 service.

Check information: The check information is used for checking whether an error occurs during the transmission of overhead information or of overhead information and service data, e.g., by using a cyclic redundancy algorithm such as CRC4, CRC6, CRC8, etc., or a parity check algorithm, which will not be enumerated herein.

Based on the frame structure described above, how to set the frame structure according to the service rate during the processing of the low-rate service to ensure the efficiency of transmitting the low-rate service in the fine-grained slot pipeline is described in detail below.

It can be understood that the frame structure in the embodiments of the present disclosure not only can be applied to the FlexE protocol to use a slot of an FlexE interface, but also can be applied to a standard Ethernet protocol to use a physical interface with a rate of 10G. The difference between the frame structures for the two protocols and the mapping relationship of service data in the frame structures will be described later through examples.

Figure 10:
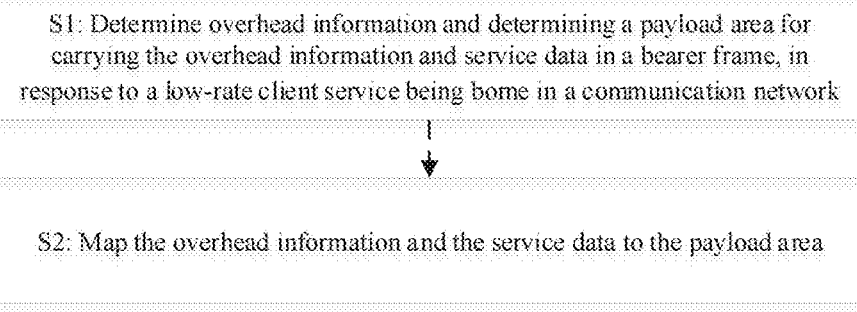
FIG. 10 is an overall flowchart of a service processing method according to an embodiment of the present disclosure.

Referring to FIG. 10, an embodiment of the present disclosure provides a service processing method, including, but not limited to, the following steps S1 and S2.

At S1, overhead information is determined and a payload area for carrying the overhead information and service data is determined in a bearer frame when a low-rate client service is borne in a communication network, where the bearer frame is a specific code block stream including an S block, a D block and a T block, or a standard Ethernet frame as defined in an Ethernet protocol.

At S2, the overhead information and the service data are mapped to the payload area.

Figure 11:
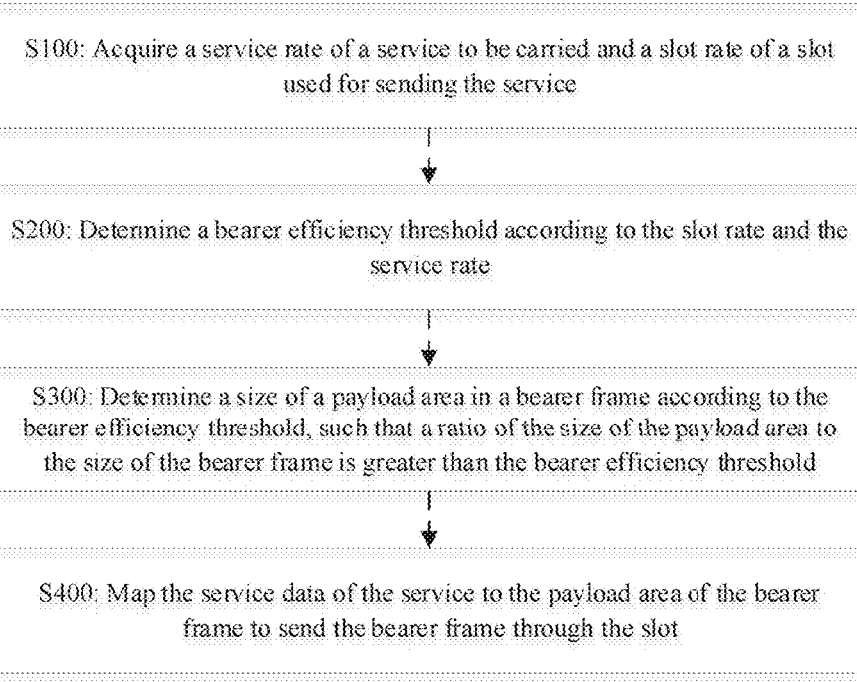
FIG. 11 is a flowchart of service processing considering a bearer efficiency threshold according to an embodiment of the present disclosure.

In the embodiments of the present disclosure, to reasonably carry as many services as possible in a fine-grained service slot pipeline, a slot rate of the current slot pipeline and a service rate of a service to be carried need to be considered based on the frame structure of the bearer frame, so as to determine the number of D blocks and the size of areas used for carrying service data in the S block and the T block. Referring to FIG. 11, the method can be implemented by performing the following steps S100 to S400.

At S100, a service rate of a service to be carried and a slot rate of a slot used for sending the service are acquired, where the slot rate is greater than the service rate such that the slot accommodates at least one service.

At S200, a bearer efficiency threshold is determined according to the slot rate and the service rate.

At S300, a size of a payload area in a bearer frame is determined according to the bearer efficiency threshold, such that a ratio of the size of the payload area to the size of the bearer frame is greater than the bearer efficiency threshold, where the bearer frame is a data frame used for carrying service data of the service.

At S400, the service data of the service is mapped to the payload area of the bearer frame to send the bearer frame through the slot.

In an example where E1/T1 services are carried with a sub-slot bandwidth of 10.1 Mbit/s, four E1 services with a service rate of 2.048 Mbit/s (or six T1 services with a service rate of 1.544 Mbit/s) can be simultaneously transmitted. Therefore, in the embodiment of the present disclosure, the slot rate is 10.1 Mbit/s and the service rate is 2.048 Mbit/s or 1.544 Mbit/s.

When the service rate is 2.048 Mbit/s, a maximum of four E1 services can be simultaneously transmitted based on the current slot rate (where the rate of a single E1 service is 2.048 Mbit/s, and the total service rate is 8.192 Mbit/s). Therefore, when four E1 services are carried in one slot, a minimum value of the bearer efficiency threshold is 80.49%.

When the service rate is 1.544 Mbit/s, a maximum of six T1 services can be simultaneously transmitted based on the current slot rate (where the rate of a single T1 service is 1.544 Mbit/s, and the total service rate is 9.264 Mbit/s). Therefore, when six T1 services are carried in one slot, a minimum value of the bearer efficiency threshold is 91.723%.

It can be understood that the above E1/T1 service is only an example. According to international standards, the bearer efficiency threshold can also be calculated in a similar manner for other low-rate services.

For convenience of distinguishing various data frames, in the embodiments of the present disclosure, a data frame for carrying service data is referred to as a bearer frame, the frame format of which is the frame structure described above. Because the frame structure of the bearer frame of E1 includes an S block, a plurality of D blocks, and a T block, the sizes of the frame header code block and the end code block are relatively fixed, and the overhead information can also be carried in one or more pre-allocated bytes, whether the ratio of the size of the payload area to the size of the bearer frame is greater than the bearer efficiency threshold can be determined by changing the size of the payload area. For example, for an E1 service, the bearer efficiency threshold is 80.49%, the frame structure of the bearer frame includes four D blocks, the S block carries overhead information and does not carry any service data, and the T block is a T7 block. In this case, the number of valid bytes in the payload area is 4*8 Bytes (each D block has eight bytes for carrying service data)+7 Bytes (the T7 block has seven bytes for carrying service data)=39 Bytes, i.e., 312 bits, the total length of the E1 bearer frame is (1+4+1)*66=396 bits, and the bearer efficiency of the E1 bearer frame is 312/369=78.78%, which is lower than the minimum bearer efficiency of 80.49% required for transmitting four E1 services, indicating that four E1 services cannot be simultaneously transmitted in one slot. To solve this problem, the frame structure of the bearer frame is adjusted by setting the number of D blocks in the frame structure to 5. After the adjustment, the number of valid bytes in the payload area becomes 5*8 Bytes+7 Bytes=47 Bytes, i.e., 376 bits, the total length of the E1 bearer frame becomes (1+5+1)*66=462 bits, and the bearer efficiency of the E1 bearer frame becomes 376/462=81.38%, which is greater than the minimum bearer efficiency of 80.49% required for transmitting four E1 services, indicating that four E1 services can be simultaneously transmitted in one slot.

The above is an example of carrying the E1 service. For a T1 service or other low-rate services, the frame structure of the bearer frame can be determined according to the above calculation method to ensure the bearer efficiency at the current slot rate, which will not be enumerated herein.

According to the structure of the current bearer frame, there are two bearer mapping modes for mapping the service data to the bearer frame. A first mapping mode is characterized in that the service rate of E1/T1 is consistent with the transmission rate of the E1/T1 bearer frame, and the transmission rates of E1/T1 bearer frames of different clients can be different. A second mapping mode is characterized in that service rates of different E1/T1 services can be different, but the transmission rates of all the E1/T1 bearer frames are the same. Different service processing methods using the different mapping methods will be described in detail below, and the overall scheme will be briefly introduced first.

Through the above steps S100 to S400, a corresponding processing method is provided for the transmission of a low-rate service in a fine-grained slot pipeline. Based on the bearer efficiency threshold as the parameter and the characteristic of the variable setting of the frame structure of the bearer frame, a service processing device can determine an actual frame structure of the bearer frame to be used according to an application scenario such as a service rate of a current service, to ensure that the bearer efficiency threshold is met when the current slot pipeline carries the service and solve the problem of low bearer efficiency of the low-rate service.

Figure 12:
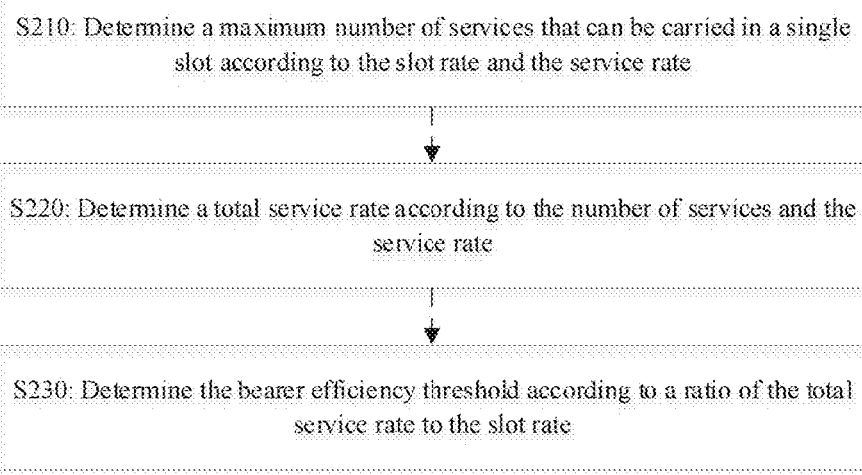
FIG. 12 is a flowchart of determining a bearer efficiency threshold according to an embodiment of the present disclosure.

Referring to FIG. 12, it can be understood that the bearer efficiency threshold can be determined for different services and different slots by performing the following steps S210, S220, and S230.

At S210, a maximum number of services that can be carried in a single slot is determined according to the slot rate and the service rate.

At S220, a total service rate is determined according to the number of services and the service rate.

At S230, the bearer efficiency threshold is determined according to a ratio of the total service rate to the slot rate.

Similarly, in an example where E1/T1 services are carried with a sub-slot bandwidth of 10.1 Mbit/s, a maximum of four E1 services or six T1 services can be simultaneously transmitted in a single slot. A standard service rate of the E1 service is 2.048 Mbit/s, and a total rate of the four E1 services is 8.192 Mbit/s. A standard service rate of the T1 service is 1.544 Mbit/s, and a total rate of the four E1 services is 9.264 Mbit/s. Therefore, the ratio of the total rate of the E1 services to the slot rate, i.e., the bearer efficiency threshold for carrying the E1 services is 80.49%, and the bearer efficiency threshold for carrying the T1 services is 91.723%.

As can be known from to the above frame structure of the bearer frame, the bearer frame includes a frame header flag block S, data blocks D, and an end-of-frame flag T block. The data blocks are configured between the frame header flag block and the end-of-frame flag block. The size of the payload area in the bearer frame is changed by adjusting at least one of: the size of an area in the frame header flag block for carrying service data; the number of data blocks; or the size of an area in the end-of-frame flag block for carrying service data.

The S block includes the frame header code block and the first data area. The first data area can be used to carry overhead information and/or service data. When the formats of the D block and the T block are fixed, the size of the area for carrying service data in the first data area can be adjusted to change the size of the payload area. Similarly, when the formats of the S block and the T block are fixed, the number of D blocks can be increased or reduced to change the size of the payload area. The T block includes the second data area and the end code block. The second data area is used for carrying service data, and can be adjusted in size as required. When the formats of the S block and the D block are fixed, the size of the payload area varies with the size of the second data area.

In the process of mapping the service data of the service to the payload area of the bearer frame in the above step S400, different mapping modes can be used depending on different mapping relations between the service and the bearer frame. Examples are given below.

Based on the FlexE protocol, the service data is carried in the payload area according to one of the following mappings modes.

Mapping mode one: A transmission rate of the bearer frame is the same as a service rate, and the payload area of the bearer frame directly carries service data of a service corresponding to the bearer frame.

Mapping mode two: Transmission rates of the bearer frames are the same, and a size of the payload area of the bearer frame is adjusted to carry service data of a service corresponding to the bearer frame.

Mapping mode three: Transmission rates of the bearer frames are the same, a plurality of client services are carried in the payload area of the bearer frame, the payload area of the bearer frame is divided into a plurality of service carrying areas, and a size of each of the service carrying areas is adjusted to carry service data of the services corresponding to the bearer frame.

In the frame format of the standard Ethernet protocol, the bearer frame is of an Ethernet packet structure. The frame header flag block is a header of the Ethernet packet. The data blocks are a content-carrying area of the Ethernet packet. The end-of-frame flag block is a CRC field of the Ethernet packet. That is, the payload area is located in a data field area of the Ethernet frame. The Ethernet frame includes a header information field, a data field, and a CRC field in sequence. The service data is carried in the payload area according to one of the following mapping modes.

Mapping mode four: A transmission rate of the Ethernet packet is the same as a service rate, and the payload area of the Ethernet packet directly carries service data of a service corresponding to the Ethernet packet.

Mapping mode five: Transmission rates of the Ethernet packets are the same, and a size of the payload area of the Ethernet packet is adjusted to carry service data of a service corresponding to the Ethernet packet.

Mapping mode six: Transmission rates of the Ethernet packets are the same, a plurality of client services are carried in the payload area of the Ethernet packet, the payload area of the Ethernet packet is divided into a plurality of service carrying areas, and a size of each of the service carrying areas is adjusted to carry service data of the services corresponding to the Ethernet packet.

Figure 13:
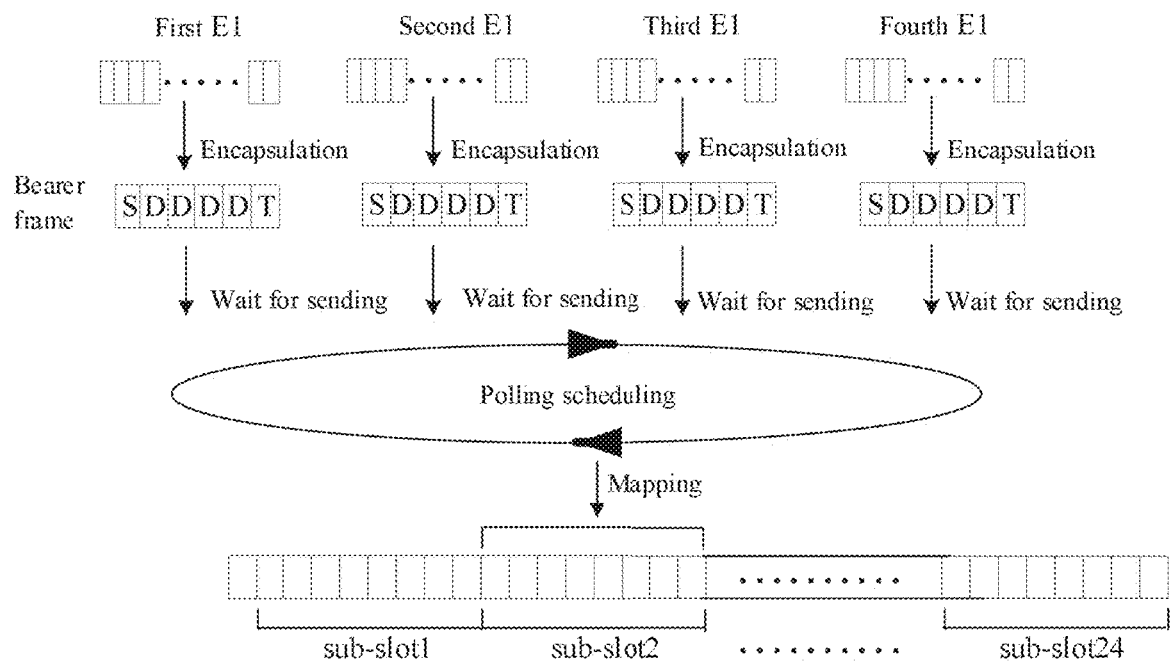
FIG. 13 is a schematic diagram of an example service processing process of mapping mode one for an E1 service according to an embodiment of the present disclosure.

The mapping modes four to six are similar to the mapping modes one to three respectively. The two mapping modes corresponding to the two protocols are only different in the structure of the bearer frame, but share the same bearer process of the bearer frame and the same mapping mode for client service data. The mapping modes one to three are used as an example. In the mapping mode one, service data of one service is mapped only to a payload area of one bearer frame, as shown in FIG. 13. The four E1 services correspond to four bearer frames one by one, and the transmission rate of the bearer frame is the same as the service rate of the corresponding service, so that the service data of each of the services is only encapsulated in the payload area of the corresponding bearer frame. A bearer frame participates in polling scheduling only after data has been encapsulated therein, and a bearer frame in which data has not been encapsulated does not participate in polling scheduling. Because the rates of different bearer frames can be different, different bearer frames can have different probabilities in participating in scheduling. When mapping and encapsulation of bearer frames of a plurality of E1/T1 services are simultaneously completed, polling scheduling is performed on the bearer frames in turn. The bearer frames of the plurality of E1/T1 services are combined into one basic unit frame through polling scheduling, which is mapped to and carried in one sub-slot according to a corresponding mapping rule.

Figure 14:
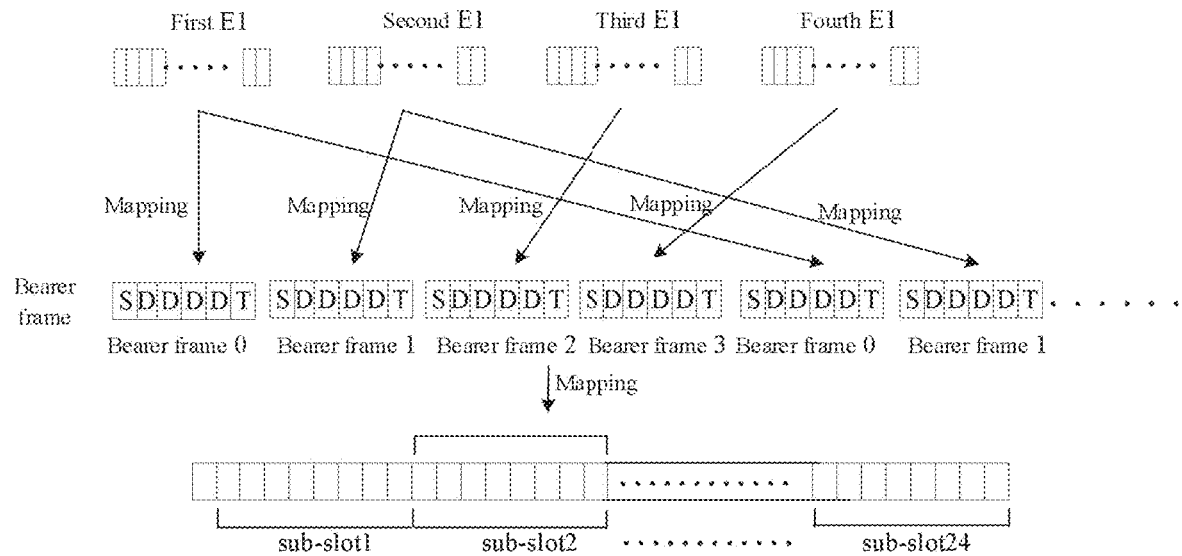
FIG. 14 is a schematic diagram of an example service processing process of mapping mode two for an E1 service according to an embodiment of the present disclosure.
Figure 15:
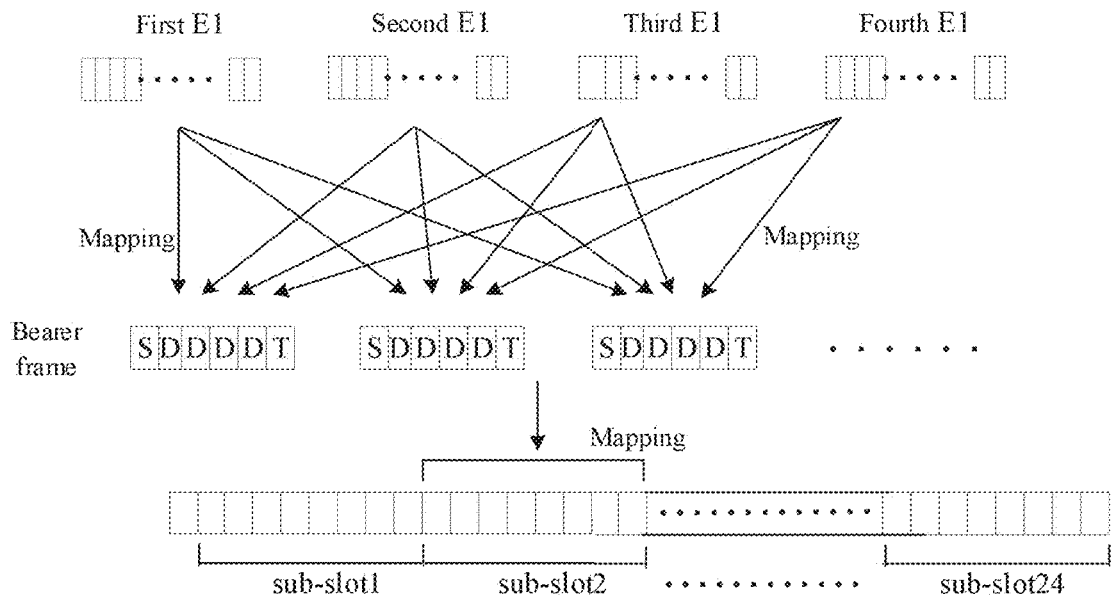
FIG. 15 is a schematic diagram of an example service processing process of mapping mode three for an E1 service according to an embodiment of the present disclosure.

In the mapping modes two and three, service data of one service is mapped to payload areas of two or more bearer frames. For the mapping mode two, as shown in FIG. 14, the service rates are different from the transmission rates of the bearer frames. The transmission rate of each of the bearer frames is determined according to a reference clock of the local device, and the transmission rates of the bearer frames are basically the same. Therefore, according to the manner of using a payload area of one bearer frame to carry service data of one service, a plurality of bearer frames at the same location need to be used to carry service data. The bearer frames in which data has been encapsulated first are sent to a slot, and polling is not required. For the mapping mode three, as shown in FIG. 15, the four services are encapsulated in payload areas according to a bit interweaving, byte interweaving, or preset partition-based interweaving. For the preset partition-based interweaving manner (where preset partition-based interweaving means that multiple services occupy different parts of a payload area), for example, a first quarter of the payload area carries a first E1 service, a second quarter of the payload area carries a second E1 service, a third quarter of the payload area carries a third E1 service, and the last quarter of the payload area carries a fourth E1 service. Because each E1 client service is carried in a fixed payload area, the overhead information can not need to include a client identification content to identify each E1 client service, and mapping and extraction can be directly performed according to an agreed relationship between carrying areas and client service numbers. It can be understood that the three interweaving methods used in the above mapping mode three are also applicable to the mapping method six in practice, which will not be described herein again.

Figure 16:
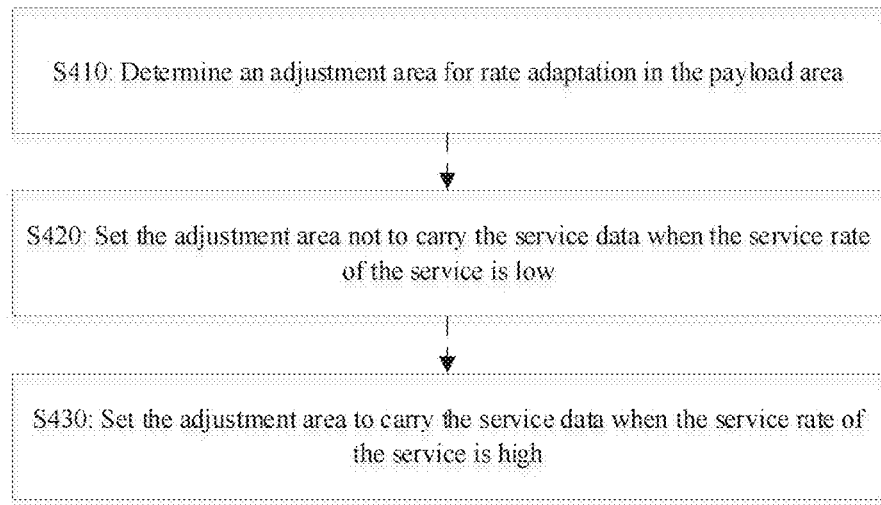
FIG. 16 is a flowchart of setting an adjustment area according to an embodiment of the present disclosure.

As mentioned above, the service rate may slightly fluctuate near the standard service rate, so that when the service processing device receives multiple services, different services may have different actual rates. The transmission rate of the bearer frame may be adjusted according to the actual service rate or according to the reference frequency provided by the service processing device (local device). This actually corresponds to the mapping mode two, the mapping mode three, the mapping mode five, or the mapping mode six. In the process of mapping the service data of the service to the payload area of the bearer frame, rate adaptation of the service and the bearer frame is performed according to an actual requirement. Referring to FIG. 16, the process of mapping the service data of the service to the payload area of the bearer frame can be implemented in the following manner.

At S410, an adjustment area for rate adaptation is determined in the payload area.

At S420, the adjustment area is set not to carry the service data when the service rate of the service is low.

At S430, the adjustment area is set to carry the service data when the service rate of the service is high.

As can be known from the above frame structure, in order to implement rate adaptation, a corresponding adjustment area can be set in the payload area, and the adjustment indication information is used to indicate whether the adjustment area carries service data, such that the size of the payload area can be fine-tuned, thereby achieving rate matching between the service and the bearer frame.

For the mapping mode two or the mapping mode three, a clock frequency of the service rate of the E1/T1 service (different E1/T1 clients may have different rates) is different from a clock frequency of the transmission rate of the bearer frame, but the transmission rates of all the bearer frames are basically consistent, so the bearer frames can be sent in sequence in a fixed order. Because the clock frequency of the service rate of E1/T1 is different from the clock frequency of the transmission rate of the bearer frame, rate adaptation needs to be performed when mapping the service to the bearer frame. The rate adjustment function is implemented by using the adjustment indication information. When the function of the adjustment indication information is enabled, a part of the payload area is set as the adjustment area (for example, the first byte or the last byte of the payload area). According to a setting rule of the frame structure, the adjustment area may or may not carry the service data. When the adjustment area is set to carry the service data, it means that the total number of bytes of the service data carried in the bearer frame at a time becomes larger, the rate of the bearer pipeline is increased, and an E1/T1 client service with a high service rate can be carried. When the adjustment area is set to not carry the service data, it means that the total number of bytes of the service data carried in the bearer frame at a time becomes smaller, the rate of the bearer pipeline is reduced, and an E1/T1 client service with a low service rate can be carried. Whether the adjustment area carries service data is determined by the content of the adjustment indication information.

Therefore, whether rate adaptation is required depends on whether the reference frequency of the bearer frame is set according to the clock frequency of the service. When the reference frequency of the bearer frame is set according to the clock frequency of the service, rate adaptation is not required between the service and the bearer frame. When the reference frequency of the bearer frame is set according to the clock frequency of the local device, rate adaptation is performed according to the actual rate of the service (where the rates of different services slightly fluctuate near the standard service rate). Therefore, referring to FIG. 17, a clock frequency adaptation process in the rate adaptation process can be implemented by performing the following steps S440 and S450.

At S440, service clock information of the service and reference clock information of the bearer frame are acquired.

At S450, timestamp value information is determined according to the service clock information and the reference clock information, and the timestamp value information is recorded in the overhead information of the bearer frame.

In the rate adaptation process, when the service data of the E1/T1 service is mapped to the bearer frame of the E1/T1 service, a time information value of the client service mapping or a deviation information value between a client service clock and the reference clock is simultaneously recorded. The information value can be used as the timestamp value information of the E1/T1 information and recorded in the overhead information of the bearer frame. After the timestamp value information is encapsulated, the bearer frame is sent to the destination device. The destination device parses the bearer frame and extracts original service data of the E1/T1 service. When the original service data of the E1/T1 service is extracted, it is determined whether the adjustment area carries the original service data according to the content of the adjustment indication information, to determine whether to extract the original service data from the adjustment area. According to the timestamp value information in the service bearer frame, clock information of the E1/T1 service is recovered, and the recovered E1/T1 clock information is used to output the service data of the E1/T1 service. When no timestamp value information is carried in the bearer frame, the clock information of the E1/T1 service is recovered using an adaptive algorithm according to a change in the amount of information of the E1/T1 service.

As described above, the timestamp value information includes many bits. Generally, the timestamp value information can be of up to 10 bytes (80 bits) according to international standards. If the timestamp value information is carried in a bearer frame of one E1/T1 service, a large portion of the bandwidth of this E1/T1 service is occupied. Therefore, a bearer frame of each E1/T1 service can be used to transmit only a part of the timestamp value information, and the transmission of all parts of the timestamp value information is completed in one multiframe period. Therefore, referring to FIG. 18, the recording of the timestamp value information in S470 can be implemented by performing the following step S451.

At S451, when a multiframe includes a plurality of bearer frames, the timestamp value information is carried in the plurality of bearer frames in the multiframe, where each of the bearer frames in the multiframe carries only a part of the timestamp value information.

To solve the problem that an excessively long timestamp value information occupies a large amount of bandwidth, it is considered to use each of a plurality of bearer frames in a multiframe to carry a part of the timestamp value information. For example, the timestamp value information is divided into four parts, namely, a timestamp part value 0, a timestamp part value 1, a timestamp part value 2, and a timestamp part value 3, which are transmitted in four bearer frames in a multiframe, thereby reducing overheads of recording timestamp information in a single bearer frame. In specific applications, the timestamp value information can be transmitted in any number of bearer frames.

It can be understood that in the mapping mode three or the mapping mode six, mapping the service data to the payload area further includes: setting one piece of adjustment indication information to indicate a state of an adjustment area corresponding to one of the services in different bearer frames; or setting a plurality of pieces of adjustment indication information, where according to a correspondence between the adjustment indication information and the services, each piece of the adjustment indication information indicates a state of an adjustment area corresponding to the service corresponding to the adjustment indication information.

The adjustment indication is described using two cases. In a first case, one piece of adjustment indication information is set. When all services are mapped to bearer frames, adjustment areas are set according to the adjustment indication information. Because there is only one piece of adjustment indication information, when service data is encapsulated in a bearer frame, the adjustment indication information is applied to one of the services in the current bearer frame. In the next bearer frame, another one of the services can be indicated according to the adjustment indication information. In a second case, a plurality of pieces of adjustment indication information are set, and there are a plurality of services. There is a correspondence between the plurality of pieces of adjustment indication information and the services, and contents indicated by any two pieces of adjustment indication information should be different. In this case, during mapping of service data of these services, the adjustment area is indicated according to the adjustment indication information corresponding to the current service, so that different adjustment indication information is used for different services in a bearer frame, thereby realizing a more reasonable carrying mode.

Efficient transmission of a low-rate service is implemented through the above steps. The embodiments of the present disclosure can be used in a scenario of carrying and transmitting a fine-grained basic unit frame (with a rate of 10.1 Mbit/s) in a 5G slot of the FlexE protocol, and can also be used in a scenario of transmitting a fine-grained basic unit frame in a 10G Ethernet interface. In the scheme of the present disclosure, a bearer frame carrying E1/T1 is mapped to a sub-slot corresponding to a fine-grained basic unit frame, and the fine-grained basic unit frame is sent to a destination device through a standard 10G Ethernet interface (where when a 10G physical interface is used, in the 10G interface scenario, 40 basic unit frames form one multiframe, each basic unit frame has 24 sub-slots, the multiframe includes a total of 960 sub-slots, the bandwidth of each sub-slot is still at the rate of 10M.). The physical interface carrying the fine-grained basic unit frames is a 10G Ethernet, not a slot of a FlexE interface. How to carry a service in a standard Ethernet packet encapsulation format will be described in the following examples.

To solve the low efficiency of transmission of a low-rate service in a fine-grained slot pipeline, in the embodiments of the present disclosure, a bearer efficiency threshold for services to be carried in the current slot pipeline is determined according to the slot rate and the service rate, and the size of the payload area in the bearer frame is set based on the bearer efficiency threshold, such that when the services are mapped to one or more bearer frames, and the one or more bearer frames are sent through the slot pipeline, the overall efficiency of the slot pipeline is ensured. This can avoid the problem of bandwidth waste in the case of the FlexE protocol, and particularly provides a scheme for the transmission of various low-rate services in SDH standards.

The service processing method in the embodiments of the present disclosure will be described below by way of three examples.

Example one is a scenario where the client service is an E1 service (with a standard service rate of 2.048 Mbit/s), and the E1 service is carried in a basic unit frame (with a transmission rate of 10.1 Mbit/s).

When a sub-slot in the basic unit frame has a bandwidth of 10.1 Mbit/s, four E1 services (each having a rate of 2.048 Mbit/s) have a total bandwidth of 8.192 Mbit/s, and four E1 client services are carried in one sub-slot in the basic unit frame, the bearer efficiency threshold is 80.49%. The frame structure of the bearer frame of the E1 service includes an S block, a plurality of D blocks, and a T block. When the number of D blocks in the frame structure is 4 and the T block is a T7 block, the number of valid bytes in the payload area is: 4*8 Bytes (each D block having eight bytes)+7 Bytes (the T7 block having seven bytes)=39 Bytes, i.e., a total of 312 bits. The total length of the E1 bearer frame is (1+4+1)*66=396 bits. The bearer efficiency of the E1 bearer frame is 312/369=78.78%, which is lower than the minimum bearer efficiency threshold of 80.49% required for transmitting four E1 services, indicating that four E1 services cannot be simultaneously transmitted in one slot. A method for improving the bearer efficiency of the bearer frame is to increase the number of D blocks in the bearer frame. When the number of D blocks in the E1 bearer frame structure is increased to five blocks, i.e., the number of D blocks in the frame structure is 5, and the T block is a T7 block, the number of valid bytes in the payload area is 5*8 Bytes (each D block having eight bytes)+7 Bytes (the T7 block having seven bytes)=47 Bytes, i.e., a total of 376 bits. The total length of the E1 bearer frame is (1+5+1)*66=462 bits, and the bearer efficiency of the E1 bearer frame becomes 376/462=81.38%, which is greater than the minimum bearer efficiency threshold of 80.49% required for transmitting four E1 services, indicating that four E1 services can be simultaneously transmitted in one slot. This calculation does not consider the bandwidth loss caused by overhead bytes, or the overhead bytes are located in the S block and do not occupy the bandwidth of the payload area, as shown in FIG. 19.

For the frame structure of the E1 bearer frame having an S block, five D blocks, and a T7 block, when the overhead information occupies the bandwidth of the payload area and the overhead information has only one byte (8 bits), the bearer efficiency of the E1 service is (376-8)/462=79.65%, which is lower than the minimum bearer efficiency of 80.49% required for transmitting four E1 services, indicating that four E1 services cannot be simultaneously transmitted in one slot. Therefore, to carry four E1 services when the overhead information occupies one byte, the bearer efficiency of the bearer frame needs to be further improved by increasing the number of D blocks. When the frame structure of the bearer frame includes an S block, six D blocks, and a T7 block, the number of bytes in the payload area is 6*8+7=55 bytes, i.e., 440 bits. The total number of bits in the frame structure is (1+6+1)*66=528 bits. When the overhead information occupies the bandwidth of the payload area and the overhead information has only one byte (8 bits), the bearer efficiency of the E1 service is (440-8)/528=81.82%, which is greater than the minimum bearer efficiency threshold of 80.49% required for transmitting four E1 services, indicating that four E1 services can be simultaneously transmitted in one slot. For the frame structure of the E1 bearer frame having an S block, six D blocks, and a T7 block, when the overhead information occupies two bytes, i.e., 16 bits, the bearer efficiency of the E1 service is (440-16)/528=80.3%, which is lower than the minimum bearer efficiency of 80.49% required for transmitting four E1 services, indicating that four E1 services cannot be simultaneously transmitted in one slot. In this case, the number of D blocks in the bearer frame of the E1 service can be increased to seven, such that the bearer frame of the E1 service includes one S block, seven D blocks, and one T7 block. In the structure of the bearer frame of the E1 service including seven D blocks, the number of valid bytes in the payload area is 7*8 Bytes (each D block having eight bytes)+7 Bytes (the T7 block having seven bytes)=63 Bytes, i.e., a total of 504 bits. The total length of the bearer frame of the E1 service is (1+7+1)*66=594 bits. When the overhead information occupies two bytes (16 bits), the bearer efficiency of the bearer frame of the E1 service is (504-16)/594=82.15%, which is greater than the minimum bearer efficiency threshold of 80.49% required for transmitting four E1 services, indicating that four E1 services can be simultaneously transmitted in one slot.

In the foregoing description of the example one, the overhead information is carried in the D blocks. In practical applications, the overhead information can also be carried in the S block. In the 64B/66B encoding technology in Ethernet standards, values of the first two bits of the S block are "10", indicating a code block of a control type. The first two bits are followed by a control word (frame header code block) with a content of "0x78", indicating that the block is an S block. Seven bytes following the content of the control word are fixed values and include six bytes of "0x55" and one byte of "OxD5". The seven bytes of fixed values following the content of the control word have no substantial effect in transmission, and can be replaced by overhead information, as shown in FIG. 20. The overhead information can be placed in any byte position of the last seven bytes in the S block. In addition to the overhead information, service data of the E1 service can also be carried in the S block, as shown in FIG. 21. In the case shown in FIG. 22, the service data can be placed in any byte position of the last seven bytes in the S block, as shown in FIG. 22 and FIG. 23.

Figure 23:
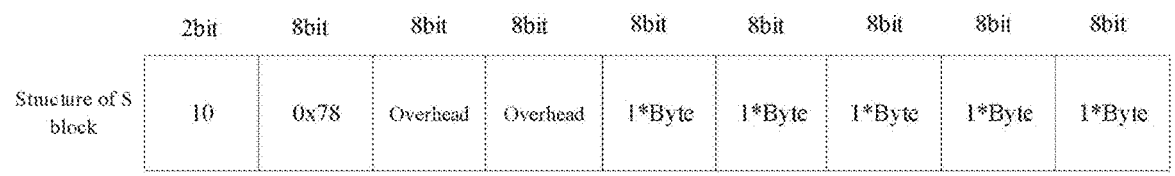
FIG. 23 is a diagram showing an arrangement of bits when overhead information and service data are configured in an S block according to Example One of the present disclosure.

For the frame structure of FIG. 23, the overhead byte information and part of the E1 service are located in the S block, in which case the highest bearer efficiency can be achieved. For example, when the frame structure of the E1 bearer frame includes an S block, a D block, and a T7 block, the number of bytes in the payload area is (7+1*8+7)=22 bytes, i.e., 176 bits. The length of the E1 bearer frame is (1+1+1)*66=198 bits. When the overhead information occupies one byte (eight bits), the bearer efficiency is (176-8)/198=84.85%, which is greater than the minimum bearer efficiency threshold of 80.49% required for transmitting four E1 services, indicating that four E1 services can be simultaneously transmitted in one slot. The bearer efficiency corresponding to different numbers of bits in the overhead information and different numbers of D blocks, as well as whether four E1 services can be simultaneously transmitted in one slot, are as shown in Table 1 below.

TABLE 1

Correspondence between frame structures of bearer frames and carrying of four E1 services

| Service bearer frame format | Number of bits in payload area | Number of bits in overhead information | Client service bits | Number of bits in bearer frame | Bearer efficiency | Whether four E1 services can be simultaneously transmitted in one slot |
|---|---|---|---|---|---|---|
| S + 1*D + T7 | 176 | 8 | 168 | 198 | 84.85% | Yes |
| S + 1*D + T7 | 176 | 16 | 160 | 198 | 80.80% | Yes |
| S + 1*D + T7 | 176 | >16 | <160 | 198 | <80.3% | No |
| S + 2*D + T7 | 240 | 24 | 216 | 264 | 81.82% | Yes |
| S + 2*D + T7 | 240 | 27 | 213 | 264 | 80.68% | Yes |
| S + 2*D + T7 | 240 | ≥28 | ≤212 | 264 | <80.3% | No |

Figure 24:
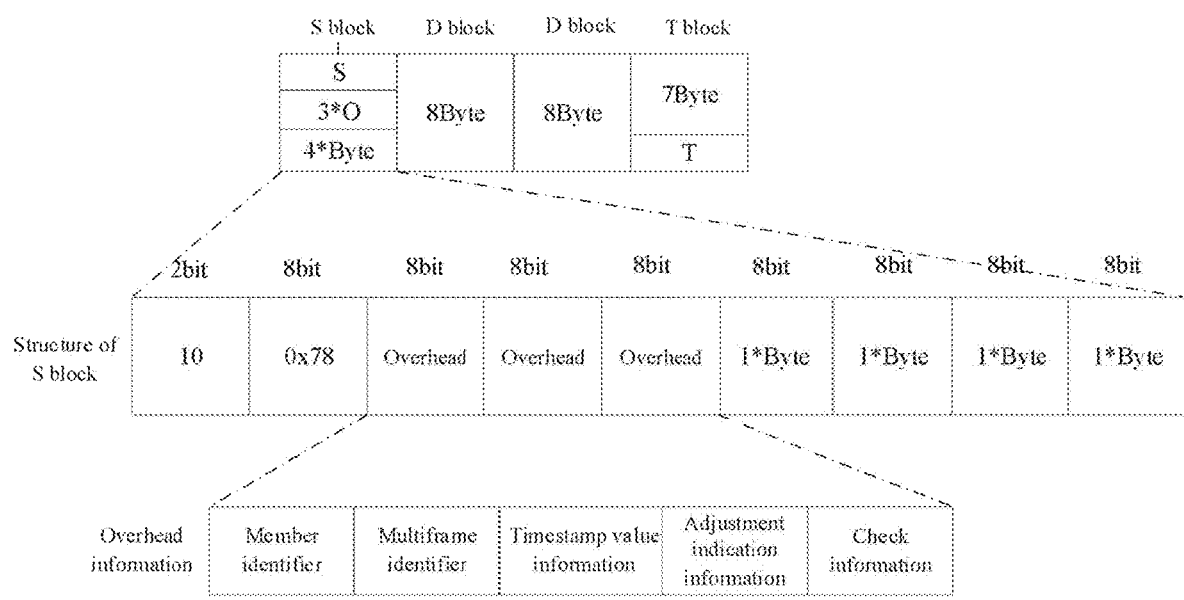
FIG. 24 is a structural diagram of a bearer frame according to mapping mode one and mapping mode two for an E1 service according to Example One of the present disclosure.

For combinations of different values of the number of D blocks and different values of the length of the overhead information in the frame structure listed in Table 1 above, an option enabling carrying four E1 services can be selected in practical applications. For example, when the structure of the bearer frame of the E1 service includes an S block, two D blocks, and a T7 block, and the number of bits in the overhead information is 24 bits (three bytes). The structure of the bearer frame of the E1 service is shown in FIG. 24.

Figure 25:
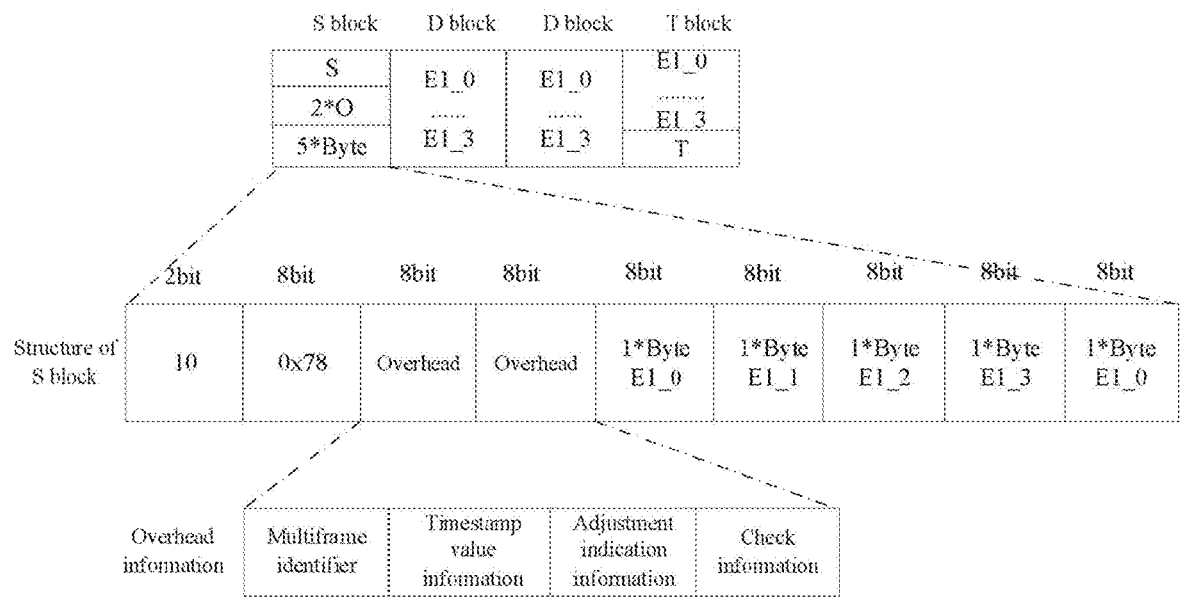
FIG. 25 is a structural diagram of a bearer frame according to mapping mode three for an E1 service according to Example One of the present disclosure.

The above description is about the mapping mode one or mapping mode two. When the mapping mode three is used, the rates of the four E1 bearer frames are consistent. In practical applications, the four E1 services can be combined and carried in only one E1 bearer frame, i.e., the four E1 services are transmitted simultaneously in one service bearer frame. As shown in FIG. 25, an area for carrying client service data in the E1 bearer frame is divided into four sub-areas, for respectively transmitting the first E1 client service, the second E1 client service, the third E1 client service, and the fourth E1 client service. Each E1 client service is carried in a fixed payload area. In FIG. 25, the four sub-areas for transmitting E1 service data are interwoven according to a byte mode. In practical applications, the four sub-areas for transmitting E1 service data can also be interwoven according to a double-byte mode. Alternatively, each client service can occupy a part of the area. For example, in the payload area, a front part (the first quarter of the payload area) carries the first E1 service, a subsequent part (the second quarter of the payload area) carries the second E1 service, a still subsequent part (the third quarter of the payload area) carries the third E1 service, and a last part (the fourth quarter of the payload area) carries the fourth E1 service. The process of carrying client services is shown in FIG. 15. Because each E1 client is carried in a fixed payload area, the overhead information may not need to include a member identifier to identify each E1 client service, and mapping and extraction can be directly performed according to an agreed relationship between carrying areas and client service numbers. There are four E1 services in a basic unit at the same time, and there may be adjustment indication signals of the four E1 services at the same time in the overhead. Because the adjustment position is in the same state most of the time (when the rate of a bearer container of the payload area in the bearer frame is slightly higher than the E1 service rate, the adjustment position is in a data-carrying state most of the time; and when the rate of the bearer container of the payload area in the bearer frame is much higher than the E1 service rate, the adjustment position is in a non-data-carrying state most of the time), one of the states can be set as a default state. For example, the default state of the adjustment area can be set as the data-carrying state, and does not need to be indicated separately. In this case, the four E1 services can share one adjustment indication signal, which is used to indicate the adjustment indication of each E1 service in a time-division multiplexing manner. For example, the adjustment indication signal with a multiframe number of "00" is used for indicating the state of the adjustment area corresponding to the first E1 service; the adjustment indication signal with a multiframe number of "01" is used for indicating the state of the adjustment area corresponding to the second E1 service; the adjustment indication signal with a multiframe number of "10" is used for indicating the state of the adjustment area corresponding to the third E1 service; and the adjustment indication signal with a multiframe number of "11" is used for indicating the state of the adjustment area corresponding to the fourth E1 service. In a bearer frame, when there is no adjustment indication signal for an E1 service signal, it indicates that the corresponding adjustment area is in the default adjustment state. The adjustment signal multiplexing can reduce the number of adjustment signals and save resources in the overhead information.

Example two is a scenario where the client service is a T1 service (with a standard service rate of 1.544 Mbit/s), and the T1 service is carried in a basic unit frame (with a transmission rate of 10.1 Mbit/s). The above three mapping modes for the E1 service are also applicable to the T1 service.

When a sub-slot in the basic unit frame has a bandwidth of 10.1 Mbit/s, six T1 services having a total bandwidth of 9.264 Mbit/s can be carried. When six T1 client services are carried in one sub-slot in the basic unit frame, the minimum bearer efficiency threshold is 91.723%, which is higher than the bearer efficiency for T1 services. To meet the requirements of the bearer efficiency threshold, for the mapping mode one or mapping mode two, e.g., the bearer mode in FIG. 20, the number of D blocks in the T1 bearer frame structure is at least 19 (where when the number of D blocks is less than 19, e.g., is 18, the bearer efficiency is only 91.51%), i.e., the T1 bearer frame structure includes an S block, 19 D blocks, and a T7 block, and the bearer efficiency is 91.77%, which is greater than the minimum bearer efficiency threshold of 91.723% in the case of carrying six T1 client services. For the bearer mode of FIG. 21 (where the S block carries T1 service data), the number of D blocks in the T1 bearer frame structure is at least 3. The bearer efficiency corresponding to different numbers of bits in the overhead information and different numbers of D blocks, as well as whether six T1 services can be simultaneously transmitted in one slot, are as shown in Table 2 below.

TABLE 2

Correspondence between frame structures of bearer frames and carrying of six T1 services

| Service bearer frame format | Number of bits in payload area | Number of bits in overhead information | Client service bits | Number of bits in bearer frame | Bearer efficiency | Whether six T1 services can be simultaneously transmitted in one slot |
|---|---|---|---|---|---|---|
| S + 3*D + T$_7$ | 304 | 0 | 304 | 330 | 92.12% | Yes |
| S + 3*D + T$_7$ | 304 | >3 | 301 | 330 | <91.21% | No |
| S + 4*D + T$_7$ | 368 | 4 | 364 | 396 | 91.92% | Yes |
| S + 4*D + T$_7$ | 368 | ≥5 | ≤363 | 396 | <91.67% | No |
| S + 5*D + T$_7$ | 432 | 8 | 424 | 462 | 91.77% | Yes |
| S + 5*D + T$_7$ | 432 | ≥9 | ≤423 | 462 | <91.55% | No |
| S + 6*D + T$_7$ | 496 | 11 | 485 | 528 | 91.86% | Yes |
| S + 6*D + T$_7$ | 496 | ≥12 | ≤484 | 528 | <91.67% | No |
| S + 7*D + T$_7$ | 560 | 15 | 545 | 594 | 91.75% | Yes |
| S + 7*D + T$_7$ | 560 | ≥16 | ≤544 | 594 | <91.58% | No |
| S + 8*D + T$_7$ | 624 | 18 | 606 | 660 | 91.82% | Yes |
| S + 8*D + T$_7$ | 624 | ≥19 | ≤605 | 660 | <91.67% | No |
| S + 9*D + T$_7$ | 688 | 22 | 666 | 726 | 91.735% | Yes |
| S + 9*D + T$_7$ | 688 | ≥23 | ≤665 | 726 | <91.597% | No |

For the frame structure of the bearer frame carrying six T1 services, when the number of bytes in the overhead information is 2 (16 bits) as shown in the format of FIG. 23, the frame structure of the bearer frame of the T1 service includes an S block, eight D blocks, and a T7 block.

Figure 26:
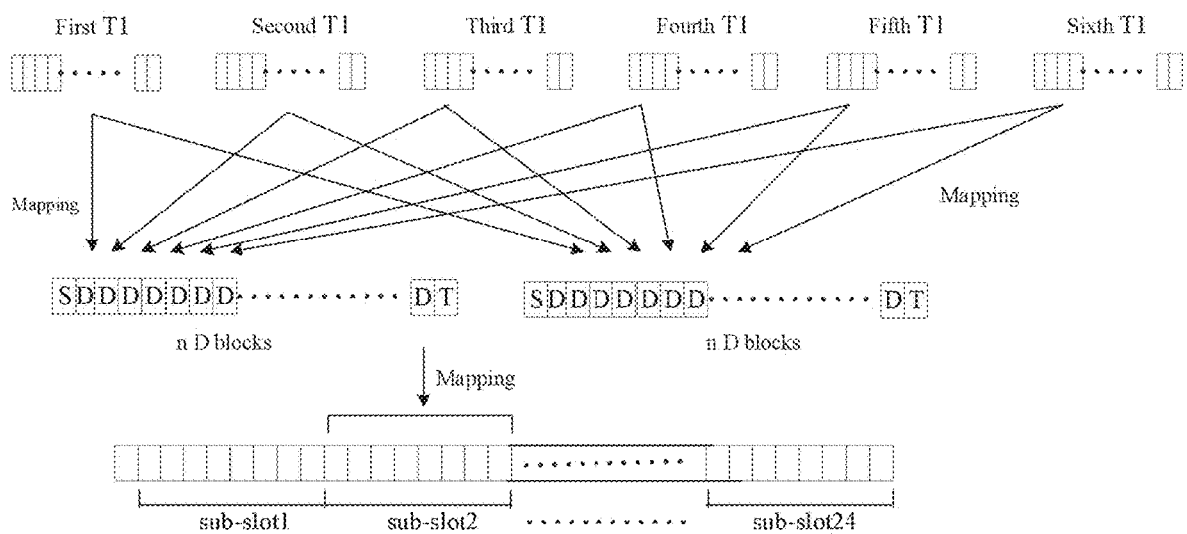
FIG. 26 is a schematic diagram of an example service processing process of mapping mode three for a T1 service according to Example Two of the present disclosure.
Figure 27:
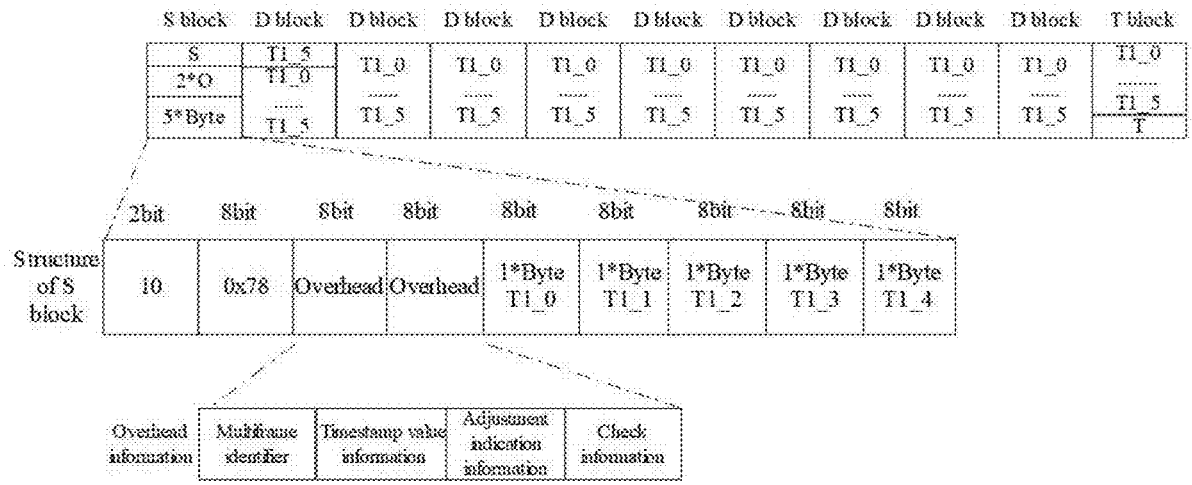
FIG. 27 is a structural diagram of a bearer frame according to mapping mode three for a T1 service according to Example Two of the present disclosure.

For the frame structure of the bearer frame carrying six T1 services, when the number of bytes in the overhead information is 2 (16 bits), in the mapping mode three, six T1 bearer frames can be combined into one T1 bearer frame, and the six T1 services are simultaneously carried in the one T1 bearer frame. A process of mapping and processing of T1 services is shown in FIG. 26. The number of D blocks in the T1 bearer frame varies with the number of bytes of the overhead information and the number of bytes of T1 client service data in the S block. When the S block carries the overhead information only and does not carry T1 service data, the structure of the bearer frame of the T1 service can include an S block, 19 D blocks, and a T7 block. When the S block carries two bytes of overhead information and five bytes of T1 service data, the structure of the bearer frame of the T1 service can include an S block, nine D blocks, and a T7 block, as shown in FIG. 27.

Example three is a bearer process of the bearer frame in a standard Ethernet packet encapsulation format.

Figure 28:
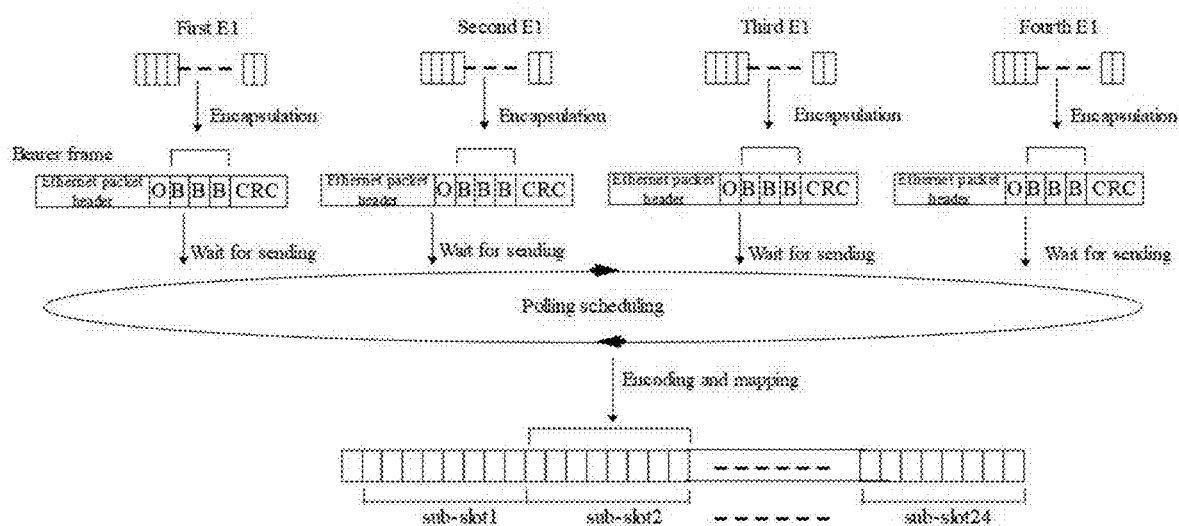
FIG. 28 is a schematic diagram of an example service processing process of mapping mode one for an E1 service using a standard Ethernet protocol according to Example Three of the present disclosure.
Figure 29:
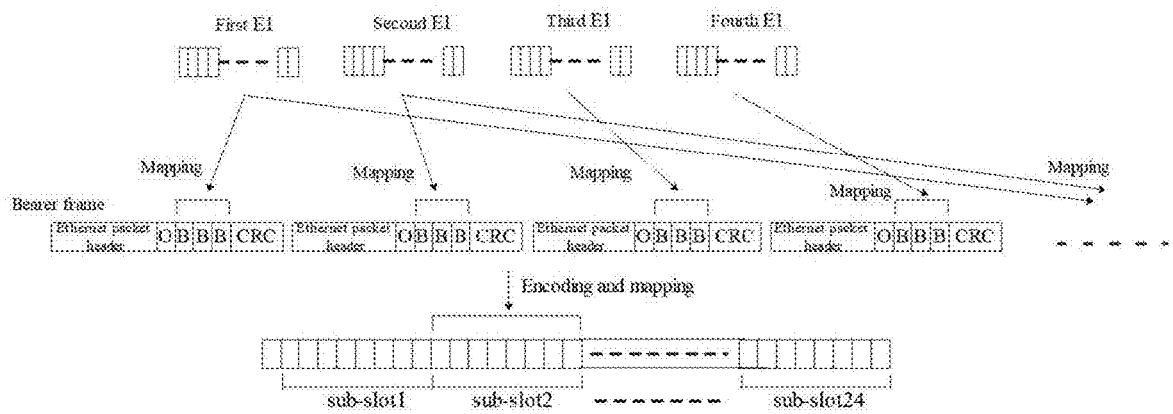
FIG. 29 is a schematic diagram of an example service processing process of mapping mode two for an E1 service using a standard Ethernet protocol according to Example Three of the present disclosure.
Figure 30:
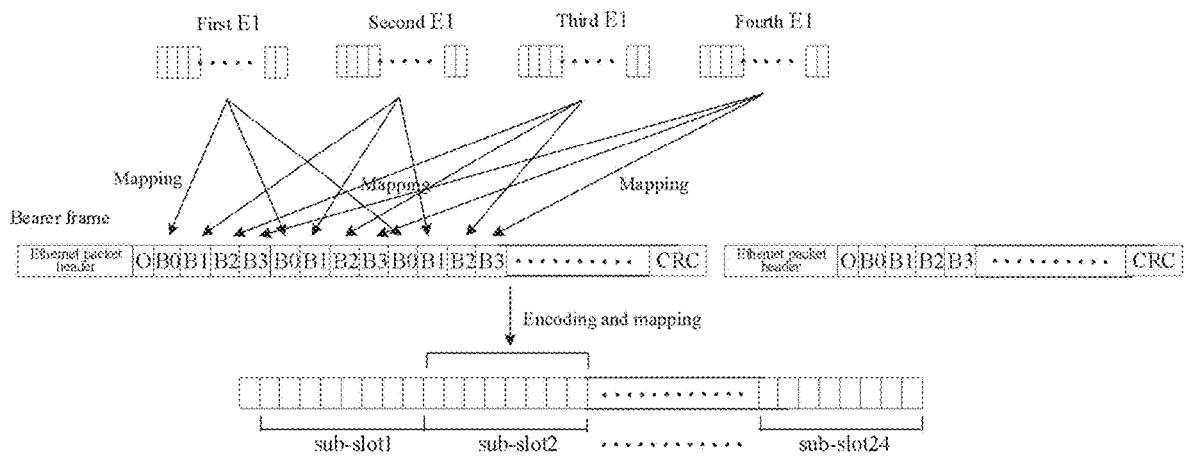
FIG. 30 is a schematic diagram of an example service processing process of mapping mode three for an E1 service using a standard Ethernet protocol according to Example Three of the present disclosure.

The three bearer mapping modes in the above example are realized using a bearer frame formed by a self-defined combination of S, D, and T blocks. By using the standard Ethernet packet encapsulation format to replace the bearer frame formed by S, D, and T blocks, the bearer process of the mapping mode one is changed to the mapping mode four as shown in FIG. 28, the bearer process of the mapping mode two is changed to the mapping mode five as shown in FIG. 29, and the bearer process of the mapping mode three is changed to the mapping mode six as shown in FIG. 30. In the mapping modes four to six, O corresponds to the overhead information in the mapping modes one to three, and B corresponds to service data (which is carried in the D blocks in the mapping modes one to three). The mapping modes one to three and the mapping modes four to six are only different in the external structure of the bearer frame, but share the same bearer process of the bearer frame and the same mapping mode for client service data.

In the mapping modes four to six, the bearer frame is in the Ethernet encapsulation format, and sequentially includes header information defined in Ethernet standards (e.g., destination Media Access Control (MAC) address, source MAC address, type field, etc.) and CRC information (e.g., a CRC32 check algorithm used in Ethernet standards). When the Ethernet packet format is used for encapsulation, the header information and the CRC information in the Ethernet packet occupy a lot of bandwidth, affecting the effective utilization rate of bandwidth of the bearer frame for carrying client data. If four E1 services or six T1 services are to be carried in a 10M sub-slot, it is necessary to increase the length of the bearer frame in the Ethernet format to increase the amount of client data in one bearer frame, thereby improving the bearer efficiency of the bearer frame. In a E1 scenario, when the number of bytes for carrying E1 in the bearer frame is X, the bearer efficiency is calculated using an efficiency calculation formula: X/(X+inter-frame gap+preamble+overhead information byte(s)+X+CRC byte(s)). When four E1 services are to be carried in a 10M sub-slot, the result of the efficiency calculation formula needs to be greater than 80.49%, and the number of bytes for carrying E1 in the bearer frame needs to be 108 or more (when the inter-frame gap occupies 12 bytes, the preamble occupies 8 bytes, and the overhead information occupies 2 bytes). When four E1 services are carried in a 10M sub-slot, the number of bytes of E1 client service data in the bearer frame can be a multiple of 4, i.e., the number of bytes for carrying E1 services in the bearer frame can be 108 (each E1 service being carried in 27 bytes, and the four E1 services being carried in a total of 108 bytes), 112 (each E1 service being carried in 28 bytes, and the four E1 services being carried in a total of 112 bytes), 116 (each E1 service being carried in 29 bytes, and the four E1 services being carried in a total of 116 bytes), etc. In a T1 scenario, when the number of bytes for carrying T1 services in the bearer frame is Y, the bearer efficiency is calculated using an efficiency calculation formula: Y/(Y+inter-frame gap+preamble+overhead information byte(s)+Y+CRC byte(s)). When six T1 services are to be carried in a 10M sub-slot, the result of the efficiency calculation formula needs to be greater than 91.723%, and the number of bytes for carrying T1 services in the bearer frame needs to be 288 or more (when the inter-frame gap occupies 12 bytes, the preamble occupies 8 bytes, and the overhead information occupies 2 bytes). When six T1 services are carried in a 10M sub-slot, the number of bytes of T1 client service data in the bearer frame can be a multiple of 6, i.e., the number of bytes for carrying T1 services in the bearer frame can be 288 (each T1 service being carried in 48 bytes, and the six T1 services being carried in a total of 288 bytes), 294 (each T1 service being carried in 49 bytes, and the six T1 services being carried in a total of 294 bytes), 300 (each T1 service being carried in 50 bytes, and the six T1 services being carried in a total of 300 bytes), etc.

An embodiment of the present disclosure provides a service processing device, including at least one processor and a memory communicatively connected to the at least one processor, where the memory stores an instruction executable by the at least one processor which, when executed by the at least one processor, causes the at least one processor to implement the service processing method.

Figure 31:
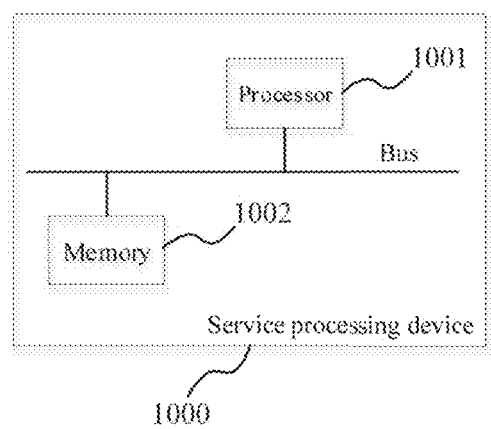
FIG. 31 is a schematic structural diagram of a service processing device according to an embodiment of the present disclosure.

Referring to FIG. 31, a control processor 1001 and a memory 1002 in a service processing device 1000 may be connected, for example via a bus. The memory 1002, as a non-transitory computer-readable storage medium, may be configured for storing a non-transitory software program and a non-transitory computer-executable program. In addition, the memory 1002 may include a high-speed random access memory, and may also include a non-transitory memory, e.g., at least one magnetic disk storage device, flash memory device, or other non-transitory solid-state storage device. In some implementations, the memory 1002 may include memories located remotely from the control processor 1001, and the remote memories may be connected to the service processing device 1000 via a network. Examples of the network include, but not limited to, the Internet, an intranet, a local area network, a mobile communication network, and combinations thereof.

A person skilled in the art may understand that the apparatus structure shown in FIG. 31 does not constitute a limitation to the service processing device 1000, and the service processing device may include more or fewer components than those shown in the figure, or some components may be combined, or a different component arrangement may be used.

Figure 17:
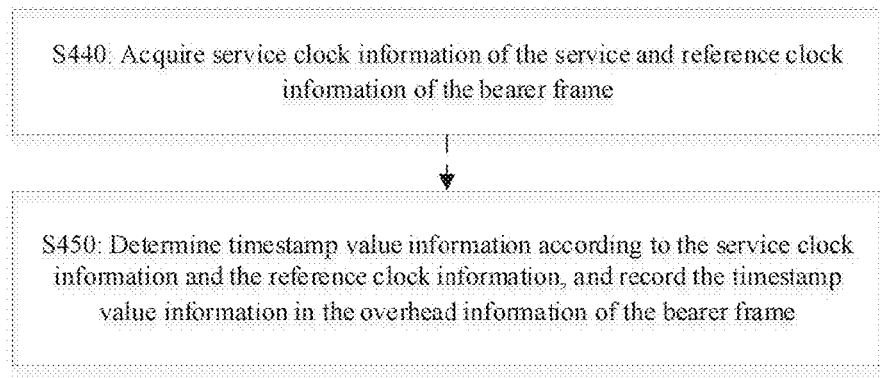
FIG. 17 is a flowchart of determining timestamp value information during rate adaptation according to an embodiment of the present disclosure.
Figure 18:
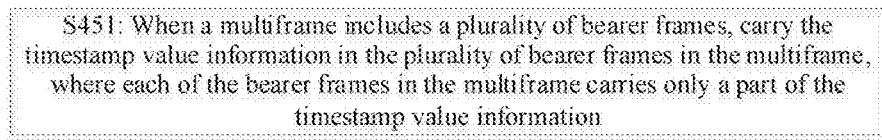
FIG. 18 is a flowchart of dividing overhead information into a plurality of parts and carrying the parts of the overhead information in a multiframe according to an embodiment of the present disclosure.

An embodiment of the present disclosure provides a computer-readable storage medium, storing a computer-executable instruction which, when executed by one or more control processors, for example, by a control processor 1001 in FIG. 31, may cause the one or more control processors to implement the service processing method in the above method embodiments, for example, implement the method steps S100 to S400 in FIG. 11, the method steps S210 to S230 in FIG. 12, the method steps S430 to S450 in FIG. 16, the method steps S460 to S470 in FIG. 17, or the method steps S471 to S472 in FIG. 18.

The service processing method provided in the embodiments of the present disclosure at least has the following beneficial effects. To solve the low efficiency of transmission of a low-rate client service in a fine-grained slot pipeline, the embodiments of the present disclosure provide a frame structure of a bearer frame. Based on the frame format of the bearer frame, a payload area is determined in an S block, a D block, and a T block or in a standard Ethernet frame. Service data is carried in the payload area. The bearer frame is sent to a destination device through a fine-grained service slot pipeline. In this way, when one or more bearer frames are sent through the slot pipeline, the overall efficiency of the slot pipeline is ensured. This can avoid the problem of bandwidth waste, and particularly provides a scheme for the transmission of various low-rate services in SDH standards.

The apparatus embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

Those having ordinary skills in the art can understand that all or some of the steps and systems in the methods disclosed above may be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

The invention claimed is:

1. A service processing method, comprising:
   determining overhead information and determining a payload area for carrying the overhead information and service data in a bearer frame, in response to a low-rate client service being borne in a communication network; and
   mapping the overhead information and the service data to the payload area;
   wherein the low-rate client service has finer service granularity than a sub-slot;
   wherein the bearer frame is a specific code block stream comprising an S block, a D block, and a T block, the payload area comprises at least one of a byte in the D block, a byte other than a control byte in the S block, or a byte other than a control byte in the T block, and wherein the S block, the D blocks and the T block occupy 66 bits, respectively, the S block comprises a synchronization header of 2 bits and a frame header code block occupying at least one byte, the T block comprises a synchronization header of 2 bits and an end code block occupying at least one byte, the D block located between the S block and the T block comprises eight bytes for carrying service data; and
   wherein the service data is carried in the payload area according to one of the following mapping modes:
   mapping mode one: a transmission rate of the bearer frame is the same as a service rate, and the payload area of the bearer frame directly carries service data of a service corresponding to the bearer frame;
   mapping mode two: the transmission rate of each bearer frame is the same, and a size of the payload area of the bearer frame is adjusted to carry service data of a service corresponding to the bearer frame; or
   mapping mode three: the transmission rate of each bearer frames is the same, a plurality of client services are carried in the payload area of the bearer frame, the payload area of the bearer frame is divided into a plurality of service carrying areas, and a size of each of the service carrying areas is adjusted to carry service data of the service corresponding to a respective one of the service carrying areas.

2. The service processing method of claim 1, wherein the overhead information comprises at least one of:
   a member identifier for distinguishing service members in a plurality of services;
   a multiframe identifier for distinguishing bearer frames forming a multiframe;
   timestamp value information for representing clock information of a service;
   adjustment indication information for indicating whether an adjustment area is to be used to carry service data, wherein the adjustment area is used for rate adaptation of the service and the bearer frame; or
   check information for storing a check field.

3. The service processing method of claim 1, wherein the bearer frame is a bearer frame of E1 service, and a first E1 client service, a second E1 client service, a third E1 client service and a fourth E1 client service are carried in the E1 bearer frame simultaneously,
   wherein an area for carrying the service data in the E1 bearing frame is divided into four sub-areas, and each sub-area is used for transmitting the service data of a corresponding E1 client service;
   wherein, each of the E1 client services in service carrying areas is arranged in a byte interweaving mode.

4. The service processing method of claim 1, wherein in the mapping mode three, each of the service carrying areas is formed by bit interweaving, byte interweaving, or preset partition-based interweaving.

5. The service processing method of claim 4, wherein the bearer frame is a bearer frame of E1 service, and a first E1 client service, a second E1 client service, a third E1 client service and a fourth E1 client service are carried in the E1 bearer frame simultaneously,
   wherein an area for carrying the service data in the E1 bearing frame is divided into four sub-areas, and each sub-area is used for transmitting the service data of a corresponding E1 client service;
   wherein, each of the E1 client services in the service carrying areas is arranged in a byte interweaving mode.

6. The service processing method of claim 1, wherein in the mapping mode two, or the mapping mode three, mapping the service data to the payload area comprises:
   determining an adjustment area for rate adaptation in the payload area;
   setting the adjustment area not to carry the service data, in response to a low service rate of the service; and
   setting the adjustment area to carry the service data, in response to a high service rate of the service.

7. The service processing method of claim 6, further comprising:

acquiring a time information value of mapping of the service to the bearer frame, and recording the time information value as timestamp value information in the overhead information; or acquiring a time information value of mapping of the service to the bearer frame and a reference clock information of the bearer frame, and recording deviation information between the time information value and the reference clock information as timestamp value information in the overhead information.

8. The service processing method of claim 7, wherein recording the timestamp value information in the overhead information comprises:

in response to a multiframe comprising a plurality of bearer frames, carrying the timestamp value information in the plurality of bearer frames in the multiframe, wherein each of the bearer frames in the multiframe carries only a part of the timestamp value information.

9. The service processing method of claim 8, the timestamp value information comprises a timestamp part value 0, a timestamp part value 1, a timestamp part value 2, and a timestamp part value 3, and the four timestamp part values are respectively transmitted in four bearing frames of one multiframe.

10. The service processing method of claim 7, further comprising:

sending the bearer frame carrying the timestamp value information to a destination device through a fine-grained service slot pipeline, such that the destination device recovers clock information of the service data carried in the bearer frame according to the timestamp value information.

11. The service processing method of claim 6, further comprising:

recovering clock information of the service using an adaptive algorithm according to a change in the amount of information of the service, in response to no timestamp value information being carried in the bearer frame.

12. The service processing method of claim 1, wherein in the mapping mode three mapping the service data to the payload area further comprises:

setting one piece of adjustment indication information to indicate whether an adjustment area corresponding to one of the services carries service data in different bearer frames;

or setting a plurality of pieces of adjustment indication information, wherein according to a correspondence between the adjustment indication information and the services, each piece of the adjustment indication information respectively indicates whether a corresponding adjustment area carries service data.

13. The service processing method of claim 12, wherein four pieces of adjustment indication information corresponding to four services are set, and the four pieces of adjustment indication information respectively indicate whether the corresponding adjustment area carries service data.

14. A service processing device, comprising at least one processor and a memory communicatively connected to the at least one processor, wherein the memory stores an instruction executable by the at least one processor which, when executed by the at least one processor, causes the at least one processor to perform a service processing method, comprising:

determining overhead information and determining a payload area for carrying the overhead information and service data in a bearer frame, in response to a low-rate client service being borne in a communication network; and mapping the overhead information and the service data to the payload area;

wherein the low-rate client service has finer service granularity than a sub-slot;

wherein the bearer frame is a specific code block stream comprising an S block, a D block, and a T block, the payload area comprises at least one of a byte in the D block, a byte other than a control byte in the S block, or a byte other than a control byte in the T block, and wherein the S block, the D blocks and the T block occupy 66 bits, respectively, the S block comprises a synchronization header of 2 bits and a frame header code block occupying at least one byte, the T block comprises a synchronization header of 2 bits and an end code block occupying at least one byte, the D block located between the S block and the T block comprises eight bytes for carrying service data; and wherein the service data is carried in the payload area according to one of the following mapping modes:

mapping mode one: a transmission rate of the bearer frame is the same as a service rate, and the payload area of the bearer frame directly carries service data of a service corresponding to the bearer frame;

mapping mode two: the transmission rate of each bearer frame is the same, and a size of the payload area of the bearer frame is adjusted to carry service data of a service corresponding to the bearer frame; or mapping mode three: the transmission rate of each bearer frames is the same, a plurality of client services are carried in the payload area of the bearer frame, the payload area of the bearer frame is divided into a plurality of service carrying areas, and a size of each of the service carrying areas is adjusted to carry service data of the service corresponding to a respective one of the service carrying areas.

15. The service processing device of claim 14, wherein the overhead information comprises at least one of:

a member identifier for distinguishing service members in a plurality of services;

a multiframe identifier for distinguishing bearer frames forming a multiframe;

timestamp value information for representing clock information of a service;

adjustment indication information for indicating whether an adjustment area is to be used to carry service data, wherein the adjustment area is used for rate adaptation of the service and the bearer frame; or check information for storing a check field.

16. The service processing device of claim 14, wherein in the mapping mode three, each of the service carrying areas is formed by bit interweaving, byte interweaving, or preset partition-based interweaving.

17. The service processing device of claim 14, wherein in the mapping mode two, or the mapping mode three, mapping the service data to the payload area comprises:

determining an adjustment area for rate adaptation in the payload area;

setting the adjustment area not to carry the service data, in response to a low service rate of the service; and setting the adjustment area to carry the service data, in response to a high service rate of the service.

18. The service processing device of claim 17, wherein the service processing method further comprises:
- acquiring a time information value of mapping of the service to the bearer frame, and recording the time information value as timestamp value information in the overhead information; or
- acquiring a time information value of mapping of the service to the bearer frame and a reference clock information of the bearer frame, and recording deviation information between the time information value and the reference clock information as timestamp value information in the overhead information.

19. The service processing device of claim 18, wherein recording the timestamp value information in the overhead information comprises:
- in response to a multiframe comprising a plurality of bearer frames, carrying the timestamp value information in the plurality of bearer frames in the multiframe, wherein each of the bearer frames in the multiframe carries only a part of the timestamp value information.

20. The service processing device of claim 18, the service processing method further comprises:
- sending the bearer frame carrying the timestamp value information to a destination device through a fine-grained service slot pipeline, such that the destination device recovers clock information of the service data carried in the bearer frame according to the timestamp value information.

* * * * *